(12) United States Patent
Takahashi et al.

(10) Patent No.: US 11,472,951 B2
(45) Date of Patent: Oct. 18, 2022

(54) HETEROPHASIC PROPYLENE POLYMER MATERIAL AND USE OF THE SAME

(71) Applicant: SUMITOMO CHEMICAL COMPANY, LIMITED, Tokyo (JP)

(72) Inventors: Shun Takahashi, Chiba (JP); Masahiro Yanagisawa, Osaka (JP)

(73) Assignee: SUMITOMO CHEMICAL COMPANY, LIMITED, Tokyo (JP)

(*) Notice: Subject to any disclaimer, the term of this patent is extended or adjusted under 35 U.S.C. 154(b) by 44 days.

(21) Appl. No.: 17/129,182

(22) Filed: Dec. 21, 2020

(65) Prior Publication Data

US 2021/0189110 A1  Jun. 24, 2021

(30) Foreign Application Priority Data

Dec. 24, 2019 (JP) .............................. JP2019-233317
Sep. 11, 2020 (JP) .............................. JP2020-153210

(51) Int. Cl.
*C08L 23/12* (2006.01)
*C08J 5/18* (2006.01)
*C08L 23/08* (2006.01)
*C08L 23/16* (2006.01)

(52) U.S. Cl.
CPC ................. *C08L 23/12* (2013.01); *C08J 5/18* (2013.01); *C08L 23/0815* (2013.01); *C08L 23/16* (2013.01); *C08L 2203/30* (2013.01); *C08L 2205/025* (2013.01); *C08L 2205/035* (2013.01); *C08L 2207/02* (2013.01); *C08L 2308/00* (2013.01)

(58) Field of Classification Search
CPC ........... C08L 2205/03; C08L 2205/035; C08L 23/04; C08L 23/06; C08L 23/08; C08L 23/10; C08L 23/12; C08L 23/14; C08L 23/142
See application file for complete search history.

(56) References Cited

U.S. PATENT DOCUMENTS

2011/0218283 A1* 9/2011 Bokhari ................. C08L 23/16
525/240
2017/0240734 A1   8/2017 Wang et al.

FOREIGN PATENT DOCUMENTS

| JP | 2007254690 | 10/2001 |
| JP | 200253716 | 2/2002 |
| JP | 2006104279 | 4/2006 |
| JP | 2013521372 | 9/2011 |
| JP | 2013528247 | 12/2011 |
| JP | 2012214710 | 11/2012 |
| JP | 2017531721 | 8/2017 |
| WO | 2011109134 | 9/2011 |
| WO | 2011156262 | 12/2011 |

* cited by examiner

*Primary Examiner* — Jeffrey C Mullis
(74) *Attorney, Agent, or Firm* — Meunier Carlin & Curfman LLC

(57) ABSTRACT

Provided is a heterophasic propylene polymer material having excellent low temperature impact resistance, tensile strength, and tensile elongation. A heterophasic propylene polymer material contains a propylene homopolymer component (A), and an ethylene-propylene copolymer component (B1) and an ethylene-propylene copolymer component (B2) having different formulations from each other, wherein a content of the propylene homopolymer component (A), a content of the ethylene-propylene copolymer component (B1), and a content of the ethylene-propylene copolymer component (B2) are 40 to 70 parts by mass, 15 to 54 parts by mass, and 6 to 15 parts by mass, respectively, with respect to 100 parts by mass of a total content of the propylene homopolymer component (A) and the ethylene-propylene copolymer components (B1) and (B2).

15 Claims, No Drawings

HETEROPHASIC PROPYLENE POLYMER MATERIAL AND USE OF THE SAME

CROSS-REFERENCE TO RELATED APPLICATIONS

This application is a US non-provisional application, which claims the benefit of priority to Japanese Patent Application No. 2019-233317, filed Dec. 24, 2019 and Japanese Patent Application No. 2020-153210, filed Sep. 11, 2020, the content of which is incorporated herein by reference in its entirety.

BACKGROUND OF THE INVENTION

Field of the Invention

The present invention relates to a heterophasic propylene polymer material and use of the same.

Description of the Related Art

Since a molded article formed of a thermoplastic elastomer composition containing an olefin polymer has high tensile strength or tear strength, and has excellent low temperature impact resistance so as to withstand use in a region with a cold climate, the molded article is used, for example, as a molding material for forming an automobile-related member.

However, it is known that rigidity of a thermoplastic elastomer is reduced due to the improvement of the low temperature impact resistance in such a production process. Meanwhile, JP-A-2017-531721 discloses a heterophasic polypropylene composition having an excellent balance between impact strength and rigidity.

SUMMARY OF THE INVENTION

However, since low temperature impact resistance, tensile strength, and tensile elongation are not sufficient in the related art described above, a heterophasic propylene polymer material having high impact resistance at a lower temperature is required.

Therefore, the present invention has been made in view of the above problems, and an object of the present invention is to provide a heterophasic propylene polymer material having excellent low temperature impact resistance, tensile strength, and tensile elongation, and its related technology.

In order to solve the above problems, the present invention includes the following features.

<1> A heterophasic propylene polymer material contains a propylene homopolymer component (A) and the following ethylene-propylene copolymer component (B), wherein a content of the propylene homopolymer component (A) and a content of the ethylene-propylene copolymer component (B) are 40 to 70 parts by mass and 30 to 60 parts by mass, respectively, with respect to 100 parts by mass of a total content of the propylene homopolymer component (A) and the ethylene-propylene copolymer component (B), the ethylene-propylene copolymer component (B) contains the following ethylene-propylene copolymer component (B1) and the following ethylene-propylene copolymer component (B2), a content of the ethylene-propylene copolymer component (B1) and a content of the ethylene-propylene copolymer component (B2) are 15 to 54 parts by mass and 6 to 15 parts by mass, respectively, with respect to 100 parts by mass of the total content of the propylene homopolymer component (A) and the ethylene-propylene copolymer component (B), the ethylene-propylene copolymer component (B1) contains a monomer unit derived from ethylene and a monomer unit derived from propylene, a content of the monomer unit derived from the ethylene and a content of the monomer unit derived from the propylene are 1 to 50 parts by mass and 50 to 99 parts by mass, respectively, with respect to 100 parts by mass of a total content of the monomer unit derived from the ethylene and the monomer unit derived from the propylene, the ethylene-propylene copolymer component (B2) contains a monomer unit derived from ethylene and a monomer unit derived from propylene, and a content of the monomer unit derived from the ethylene and a content of the monomer unit derived from the propylene are 80 to 99 parts by mass and 1 to 20 parts by mass, respectively, with respect to 100 parts by mass of a total content of the monomer unit derived from the ethylene and the monomer unit derived from the propylene.

<2> The heterophasic propylene polymer material according to <1>, wherein the content of the ethylene-propylene copolymer component (B2) is 7 to 13 parts by mass with respect to 100 parts by mass of the total content of the propylene homopolymer component (A) and the ethylene-propylene copolymer component (B).

<3> The heterophasic propylene polymer material according to <1> or <2>, wherein the content of the ethylene-propylene copolymer component (B1) is 30 to 50 parts by mass with respect to 100 parts by mass of the total content of the propylene homopolymer component (A) and the ethylene-propylene copolymer component (B).

<4> The heterophasic propylene polymer material according to any one of <1> to <3>, wherein in the ethylene-propylene copolymer component (B1), the content of the monomer unit derived from the ethylene and the content of the monomer unit derived from the propylene are 5 to 50 parts by mass and 50 to 95 parts by mass, respectively, with respect to 100 parts by mass of the total content of the monomer unit derived from the ethylene and the monomer unit derived from the propylene.

<5> The heterophasic propylene polymer material according to any one of <1> to <4>, wherein the content of the propylene homopolymer component (A) and the content of the ethylene-propylene copolymer component (B) are 45 to 55 parts by mass and 45 to 55 parts by mass, respectively, with respect to 100 parts by mass of the total content of the propylene homopolymer component (A) and the ethylene-propylene copolymer component (B).

<6> The heterophasic propylene polymer material according to any one of <1> to <5>, wherein a viscosity of the propylene homopolymer component (A) is 0.80 to 1.20 dl/g.

<7> The heterophasic propylene polymer material according to any one of <1> to <6>, wherein a viscosity of the ethylene-propylene copolymer component (B) is 2.00 to 4.00 dl/g.

<8> The heterophasic propylene polymer material according to any one of <1> to <7>, wherein the number of infusible particles having a diameter of 100 μm or more present in a sheet for measuring the number of infusible particles is 2,000 or less per 100 cm² of a sheet area, the sheet being obtained by the following procedures (a) to (d):

(a) mixing 100 parts by mass of the heterophasic propylene polymer material, 0.05 parts by mass of a neutralizer, and 0.2 parts by mass of an antioxidant with each other to obtain a mixture;

(b) melting and extruding the obtained mixture at a cylinder temperature of 220° C. and a screw rotation speed of 100 rpm using a 40 mm granulator equipped with a 100 mesh screen pack to obtain pellets;

(c) melting and extruding the obtained pellets at a cylinder temperature of 230° C. using a single screw extruder having a screw diameter of 20 mm; and (d) cooling an extruded melt using a cooling roll through which cooling water of 30° C. is passed to form a sheet having a thickness of 50 μm to 60 μm and a width of 60 mm to 70 mm.

<9> The heterophasic propylene polymer material according to <8>, wherein the number of infusible particles is 800 or less per 100 $cm^2$ of the sheet area.

<10> The heterophasic propylene polymer material according to any one of <1> to <9>, wherein the heterophasic propylene polymer material is a polymer material obtained by a multistage polymerization method.

<11> A thermoplastic elastomer composition containing: the heterophasic propylene polymer material according to any one of <1> to <10>; and an ethylene-α-olefin copolymer containing a monomer unit derived from ethylene and a monomer unit derived from an α-olefin having 4 to 10 carbon atoms.

<12> The thermoplastic elastomer composition according to <11>, wherein a content of the ethylene-α-olefin copolymer is 5 to 20 parts by mass with respect to 100 parts by mass of a content of the heterophasic propylene polymer material.

<13> A molded article comprising the heterophasic propylene polymer material according to any one of <1> to <10> or the thermoplastic elastomer composition according to <11> or <12>.

<14> An airbag cover material comprising the heterophasic propylene polymer material according to any one of <1> to <10> or the thermoplastic elastomer composition according to <11> or <12>.

According to the heterophasic propylene polymer material according to the present invention, a molded article having excellent low temperature impact resistance, tensile strength, and tensile elongation can be obtained.

DETAILED DESCRIPTION OF THE PREFERRED EMBODIMENTS

Hereinafter, an embodiment of the present invention will be described, but the present invention is not limited thereto. The present invention is not limited to configurations described below, and various changes may be made within the scope of the claims. The technical scope of the present invention also includes embodiments and examples obtained by appropriately combining technical means disclosed in different embodiments and examples. In addition, unless otherwise specified in the present specification, a numerical range expressed as "A to Bx (x represents a unit)" means "Ax or more and Bx or less".

1. Heterophasic Propylene Polymer Material

In the present specification, a heterophasic propylene polymer material is a composition containing a propylene homopolymer component (A) and an ethylene-propylene copolymer component (B). Here, the ethylene-propylene copolymer component (B) contains an ethylene-propylene copolymer component (B1) and an ethylene-propylene copolymer component (B2).

In general, the heterophasic propylene polymer material contains a polymer of randomly polymerized segments obtained by multistage polymerization, and has a sea-island structure in which disperse phases containing the ethylene-propylene copolymer component (B) as a main component are uniformly dispersed in a matrix (also called a continuous phase) containing the propylene homopolymer component (A) as a main component among the propylene homopolymer component (A) and the ethylene-propylene copolymer component (B). A segment of the propylene homopolymer component (A), a segment of the ethylene-propylene copolymer component (B1), and a segment of the ethylene-propylene copolymer component (B2) are included in the segment, and these segments are randomly polymerized to form a polymer of a segment.

Propylene Homopolymer Component (A)

A content of the propylene homopolymer component (A) in the heterophasic propylene polymer material according to an embodiment of the present invention is 40 to 70 parts by mass with respect to 100 parts by mass of a total content of the propylene homopolymer component (A) and the ethylene-propylene copolymer component (B). The content is preferably 45 parts by mass or more and more preferably 47 parts by mass or more. In addition, the content is preferably 55 parts by mass or less and more preferably 51 parts by mass or less.

When the content of the propylene homopolymer component (A) is 40 parts by mass or more, a matrix of the propylene homopolymer component (A) can be appropriately formed in the heterophasic propylene polymer material. Therefore, high rigidity can be imparted to the heterophasic propylene polymer material. In addition, when the content of the propylene homopolymer component (A) in the heterophasic propylene polymer material is 70 parts by mass or less, a molded article material having not only high rigidity but also impact resistance can be implemented.

Hereinafter, in the present specification, the "total content of the propylene homopolymer component (A) and the ethylene-propylene copolymer component (B)" may be abbreviated as a "total content of the components".

Ethylene-Propylene Copolymer Component (B)

The ethylene-propylene copolymer component (B) in the heterophasic propylene polymer material according to an embodiment of the present invention contains the ethylene-propylene copolymer component (B1) and the ethylene-propylene copolymer component (B2). Hereinafter, in the present specification, the "ethylene-propylene copolymer component (B1)" may be abbreviated as a "component (B1)". In addition, the "ethylene-propylene copolymer component (B2)" may be abbreviated as a "component (B2)".

A content of the ethylene-propylene copolymer component (B) contained in the heterophasic propylene polymer material according to an embodiment of the present invention is 30 to 60 parts by mass with respect to 100 parts by mass of the total content of the components. The content is preferably 45 parts by mass or more and more preferably 49 parts by mass or more.

When the content of the ethylene-propylene copolymer component (B) is 30 parts by mass or more, high impact resistance can be applied to the heterophasic propylene polymer material. Furthermore, since the content of the propylene homopolymer component (A) can be relatively reduced, the number of infusible particles described below can be reduced, and when the content of the propylene homopolymer component (A) is 55 parts by mass or more, the number of infusible particles can be significantly reduced. Therefore, it is possible to obtain a heterophasic propylene polymer material suitable for obtaining a molded article having an appropriate appearance suitable for non-coating applications. In addition, when the content of the ethylene-propylene copolymer component (B) composed of the ethylene-propylene copolymer component (B1) and the ethylene-propylene copolymer component (B2) in the heterophasic propylene polymer material is 60 parts by mass or less, the heterophasic propylene polymer material can be used as a molded article material having high rigidity and high impact resistance and excellent low temperature impact resistance.

Ethylene-Propylene Copolymer Component (B1)

The ethylene-propylene copolymer component (B1) contains a monomer unit derived from ethylene and a monomer unit derived from propylene. In the component (B1), a content of the monomer unit derived from the ethylene and a content of the monomer unit derived from the propylene are 1 to 50 parts by mass and 50 to 99 parts by mass, respectively, with respect to 100 parts by mass of a total content of the monomer unit derived from the ethylene and the monomer unit derived from the propylene.

The content of the monomer unit derived from the ethylene in the component (B1) is preferably 5 parts by mass or more, more preferably 10 parts by mass or more, and still more preferably 20 parts by mass or more. In addition, the content is preferably 50 parts by mass or less, more preferably 45 parts by mass or less, and still more preferably 40 parts by mass or less. The content of the monomer unit derived from the propylene in the component (B1) is preferably 50 parts by mass or more, more preferably 55 parts by mass or more, and still more preferably 60 parts by mass or more. In addition, the content is preferably 95 parts by mass or less, more preferably 90 parts by mass or less, and still more preferably 80 parts by mass or less.

When the content of the monomer unit derived from the ethylene in the component (B1) is reduced within the above range, it is possible to obtain a molded article material having excellent mechanical strength such as tensile strength or tensile elongation even at room temperature.

In an embodiment of the present invention, the content of the component (B1) is 15 to 54 parts by mass with respect to 100 parts by mass of the total content of the components. The content is preferably 30 parts by mass or more and more preferably 35 parts by mass or more. In addition, the content is preferably 50 parts by mass or less and more preferably 45 parts by mass or less. When the content of the component (B1) is within the above range, it is possible to prevent tensile strength and tensile elongation at room temperature from being damaged even though the component (B2) is contained.

Ethylene-Propylene Copolymer Component (B2)

The ethylene-propylene copolymer component (B2) contains a monomer unit derived from ethylene and a monomer unit derived from propylene. In the component (B2), a content of the monomer unit derived from the ethylene and a content of the monomer unit derived from the propylene are 80 to 99 parts by mass and 1 to 20 parts by mass, respectively, with respect to 100 parts by mass of a total content of the monomer unit derived from the ethylene and the monomer unit derived from the propylene.

The content of the monomer unit derived from the ethylene in the component (B2) is preferably 83 parts by mass or more and more preferably 85 parts by mass or more. In addition, the content is preferably 95 parts by mass or less and more preferably 93 parts by mass or less. The content of the monomer unit derived from the propylene in the component (B2) is preferably 5 parts by mass or more and more preferably 7 parts by mass or more. In addition, the content is preferably 17 parts by mass or less and more preferably 15 parts by mass or less.

In addition, the content of the component (B2) is 6 to 15 parts by mass with respect to 100 parts by mass of the total content of the components. The content is preferably 7 parts by mass or more. In addition, the content is preferably 13 parts by mass or less and more preferably 10 parts by mass or less.

Within the above range, when the content of the component (B2) is increased, a molded article material having excellent tensile strength and tensile elongation can be obtained. Furthermore, when the heterophasic propylene polymer material according to an embodiment of the present invention contains the ethylene-propylene copolymer component (B2) in an amount of 5 to 15 parts by mass with respect to 100 parts by mass of the total content of the components, the heterophasic propylene polymer material can have high impact resistance even under an extreme cold condition (for example, −40° C. or lower). Here, a molded article obtained from the heterophasic propylene polymer material has impact resistance at a low temperature. Since the heterophasic propylene polymer material has high impact resistance under such an extreme cold condition, the heterophasic propylene polymer material can be used as a molded article used in a cold region, for example, a molding material for forming an automobile-related member.

Optional Component

In an embodiment of the present invention, each of the component (B1) and the component (B2) may optionally contain a monomer unit derived from an α-olefin having 4 to 12 carbon atoms. In this case, each of the component (B1) and the component (B2) and the monomer unit derived from the α-olefin having 4 to 12 carbon atoms may form a random copolymer or a block copolymer.

Examples of the copolymer can include a propylene-ethylene copolymer, a propylene-ethylene-1-butene copolymer, a propylene-ethylene-1-hexene copolymer, and a propylene-ethylene-1-octene copolymer. Among them, a propylene-ethylene copolymer or a propylene-ethylene-1-butene copolymer is preferred.

A content of the monomer unit derived from the α-olefin having 4 to 12 carbon atoms in the component (B1) is preferably 1 part by mass or more, more preferably 5 parts by mass or more, and still more preferably 10 parts by mass or more, with respect to 100 parts by mass of the component (B1). In addition, the content is preferably 100 parts by mass or less, more preferably 95 parts by mass or less, and still more preferably 90 parts by mass or less. It is preferable that the content is within this range from the viewpoint of low temperature impact resistance. For example, the content of the monomer unit can be calculated by infrared spectroscopy.

A content of the monomer unit derived from the α-olefin having 4 to 12 carbon atoms in the component (B2) is preferably 1 part by mass or more, more preferably 5 parts by mass or more, and still more preferably 10 parts by mass or more, with respect to 100 parts by mass of the component (B2). In addition, the content is preferably 100 parts by mass or less, more preferably 95 parts by mass or less, and still more preferably 90 parts by mass or less. It is preferable that the content is within this range from the viewpoint of low temperature impact resistance.

Examples of the α-olefin having 4 to 12 carbon atoms can include 1-butene, 1-pentene, 1-hexene, 1-heptene, 1-octene, 1-nonene, 1-decene, 1-undecene, 1-dodecene, 3-methyl-1-butene, 3-methyl-1-pentene, 4-methyl-1-pentene, 2 ethyl-1-hexene, and 2,2,4-trimethyl-1-pentene. These α-olefins can be used alone or in combination of two or more thereof.

The α-olefin included in the component (B1) is preferably an α-olefin having 4 to 8 carbon atoms. The α-olefin included in the component (B2) is preferably an α-olefin having 4 to 8 carbon atoms.

In a case where each of the component (B1) and the component (B2) contains a monomer unit derived from an α-olefin having 4 to 12 carbon atoms, the content of each of the component (B1) and the component (B2) is as follows. That is, the content of the component (B1) is 65 to 90 parts by mass with respect to 100 parts by mass of the total content of the component (B1) and the component (B2). The content of the component (B2) is 10 to 35 parts by mass. It is preferable that the content of each of the component (B1) and the component (B2) is within this range from the viewpoints of low temperature impact resistance, tensile strength, and tensile elongation.

Calculation of Contents of Component (B1) and Component (B2)

The propylene homopolymer component (A) and the component (B1) are soluble in orthodichlorobenzene at 115° C., and the component (B2) is insoluble in orthodichlorobenzene at 115° C. Therefore, the content of each of the components can be analyzed by using a difference in solubility in orthodichlorobenzene at 115° C. As an example, the content of the component (B2) in the heterophasic propylene polymer material can be calculated using thermal gradient interaction chromatography (TG-IC). A specific method is as follows.

First, 20 mg of a sample of the heterophasic propylene polymer material is heated and stirred in 20 ml of orthodichlorobenzene containing 2-6-di-tert-butyl toluene (BHT) with 0.05 wt % at 160° C. for 60 minutes to prepare a sample solution having a concentration of 1.0 mg/ml. 0.5 ml of the sample solution is injected into a graphite-filled column held at 160° C. in a TG-IC apparatus and held for 20 minutes. Next, a temperature of the graphite-filled column is lowered to 115° C. at a rate of 20° C./min and held at 115° C. for 20 minutes. At this time, an insoluble component (component (B2)) that is insoluble in orthodichlorobenzene at 115° C. is eluted. An elution amount of the insoluble component is measured by gel permeation chromatography (GPC, embedded in the TG-IC apparatus) equipped with an infrared spectrophotometer to calculate the elution amount at 115° C.

Next, the temperature of the graphite-filled column is raised to 119° C. at a rate of 20° C./min and held for about 19 minutes, and then the elution amount of the insoluble component at 119° C. is measured by GPC. Similarly, the temperature of the graphite-filled column is sequentially raised to 123° C., 127° C., 131° C., 135° C., 139° C., 143° C., 147° C., 151° C., 155° C., and 160° C. to measure the elution amount of the insoluble component under each temperature condition.

Here, the propylene homopolymer component (A) and the component (B1) are soluble in orthodichlorobenzene at 115° C., and the component (B2) is insoluble in orthodichlorobenzene at 115° C. Therefore, a content ($X_{B2}$) of the component (B2) in the heterophasic propylene polymer material can be calculated as a ratio (mass %) of the elution amount (that is, a sum of elution amounts at temperatures of 119° C. to 160° C.) at 119° C. or higher to a total elution amount (that is, a sum of elution amounts at temperatures of 115° C. to 160° C.). The content ($X_{B2}$) can be calculated as a total amount (mass %) of the insoluble component that can be eluted at 119 to 160° C. with respect to a total amount of the insoluble component that can be eluted at 115 to 160° C. In addition, the content ($X_{B2}$) can be calculated by calculating a ratio (mass %) of differences between a soluble component in the sample solution at 160° C. and a soluble component in the sample solution at 115° C. with respect to the soluble component (solute) in the sample solution at 160° C.

A content ($X_{B1}$) of the component (B1) in the heterophasic propylene polymer material is calculated by the following equation.

$$(X_{B1}) = (X_B) - (X_{B2})$$

Here, ($X_B$) represents the content of the ethylene-propylene copolymer component (B).

A content ($Y_{B2}$) of the monomer unit derived from the ethylene of the component (B2) in the heterophasic propylene polymer material is calculated by the following equations.

$$(Y_{B2}) = (W_{119°\,C.} \times E_{119°\,C.} + W_{123°\,C.} \times E_{123°\,C.} + W_{127°\,C.} \times E_{127°\,C.} + W_{131°\,C.} \times E_{131°\,C.} + W_{135°\,C.} \times E_{135°\,C.} + W_{139°\,C.} \times E_{139°\,C.} + W_{143°\,C.} \times E_{143°\,C.} + W_{147°\,C.} \times E_{147°\,C.} + W_{151°\,C.} \times E_{151°\,C.} + W_{155°\,C.} \times E_{155°\,C.} + W_{160°\,C.} \times E_{160°\,C.}) / W_T$$

$$W_T = (W_{119°\,C.} + W_{123°\,C.} + W_{127°\,C.} + W_{131°\,C.} + W_{135°\,C.} + W_{139°\,C.} + W_{143°\,C.} + W_{147°\,C.} + W_{151°\,C.} + W_{155°\,C.} + W_{160°\,C.})$$

$$E_T = 0.5204 \times T(°\,C.) + 20.932 \quad (1)$$

Here, $W_T$ is an elution amount (mass %) at a temperature T (° C.) with respect to the total elution amount, and is equal to a difference between an amount of solute after the temperature rise and an amount of solute before the temperature rise. $E_T$ is a value corresponding to a maximum amount (mass %) of the monomer unit derived from the ethylene that can be contained in the ethylene-propylene copolymer component dissolved in orthodichlorobenzene at a concentration of 1.0 mg/ml under a condition of the temperature T (° C.). However, when $E_T$ exceeds 100 (mass %), $E_T$ is 100 (mass %). (1) described above can vary depending on a type of the obtained heterophasic propylene polymer material, but is an empirical formula derived from a relationship between an elution temperature of the component (B2) and a content of ethylene in the heterophasic propylene polymer material. A method of creating the equation in each column of examples will be described.

A content ($Y_{B1}$) of the monomer unit derived from the ethylene of the component (B1) in the heterophasic propylene polymer material is calculated by the following equation.

$$(Y_{B1}) = ((X_B) \times (Y_B) - (X_{B2}) \times (Y_{B2})) / (X_{B1})$$

2. Physical Properties of Heterophasic Propylene Polymer Material

Intrinsic Viscosity

A viscosity of the heterophasic propylene polymer material according to an embodiment of the present invention is preferably 1.0 dl/g or more, more preferably 1.5 dl/g or more, and still more preferably 1.8 dl/g or more. In addition, the viscosity of the heterophasic propylene polymer material is preferably 3.0 dl/g or less, more preferably 2.5 dl/g or less, and still more preferably 2.2 dl/g or less. It is preferable that the viscosity of the heterophasic propylene polymer material is within these ranges from the viewpoints of excellent low temperature impact resistance and rigidity of a molded article.

In an embodiment of the present invention, a viscosity of the propylene homopolymer component (A) is preferably 0.80 dl/g or more and more preferably 0.9 dl/g or more. In addition, the viscosity of the propylene homopolymer component (A) is preferably 1.20 dl/g or less and more preferably 1.1 dl/g or less. It is preferable that the viscosity of the propylene homopolymer component (A) is within these ranges from the viewpoints of excellent low temperature impact resistance and rigidity of a molded article.

In an embodiment of the present invention, a viscosity of the ethylene-propylene copolymer component (B) is preferably 2.00 dl/g or more and more preferably 2.2 dl/g or more. In addition, the viscosity of the ethylene-propylene copolymer component (B) is preferably 4.00 dl/g or less, more preferably 3.5 dl/g or less, and still more preferably 3.3 dl/g or less. It is preferable that the viscosity of the ethylene-propylene copolymer component (B) is within these ranges from the viewpoints of excellent low temperature impact resistance, tensile strength, and tensile elongation of a molded article.

The viscosity of each of the heterophasic propylene polymer material and the propylene homopolymer component (A) according to an embodiment of the present invention is an intrinsic viscosity measured in tetralin at a temperature 135° C., and as an example, the intrinsic viscosity can be calculated by a calculation method described in "Polymer Solution, Polymer Experiment Study, Vol. 11" page 491 (published by Kyoritsu Shuppan Co., Ltd., 1982). That is, the intrinsic viscosity is a viscosity calculated by plotting a reduced viscosity against a concentration and extrapolating the concentration in zero by an extrapolation method. The reduced viscosity is obtained by measuring three points of concentrations of 0.1 g/dL, 0.2 g/dL, and 0.5 g/dL with an Ubbelohde viscometer under a condition of a temperature of 135° C. and a tetralin solvent. The intrinsic viscosity of the ethylene-propylene copolymer component (B) can be calculated based on the intrinsic viscosity of each of the heterophasic propylene polymer material and the propylene homopolymer component (A).

The intrinsic viscosity [η] of each of the heterophasic propylene polymer material, the propylene homopolymer component (A), and the ethylene-propylene copolymer component (B) according to an embodiment of the present invention can be controlled by adjusting a hydrogen concentration of a gas phase portion in a polymerization vessel during polymerization of each component.

Infusible Particle

The heterophasic propylene polymer material can contain infusible particles generally called a "butsu" in its production process. The infusible particle is not dissolved in the matrix of the heterophasic propylene polymer material and is large enough to be recognized as a foreign matter even when the heterophasic propylene polymer material is melted and molded. The infusible particles can be infusible particles containing the ethylene-propylene copolymer component (B) as a main component.

In the heterophasic propylene polymer material according to an embodiment of the present invention, the number of infusible particles having a diameter of 100 μm or more present in a sheet for measuring the number of infusible particles is preferably 2,000 or less per 100 cm² of a sheet area, the sheet being obtained by the following procedures (a) to (d). It is preferable that the number of infusible particles is small from the viewpoints of an appearance, tensile strength, and tensile elongation. The number of materials is more preferably 1,000 or less and still more preferably 800 or less.

(a) 100 parts by mass of the heterophasic propylene polymer material, 0.05 parts by mass of a neutralizer, and 0.2 parts by mass of an antioxidant are mixed with each other.

(b) The obtained mixture is melted and extruded at a cylinder temperature of 220° C. and a screw rotation speed of 100 rpm using a 40 mm granulator equipped with a 100 mesh screen pack to obtain pellets.

(c) The obtained pellets are melted and extruded at a cylinder temperature of 230° C. using a single screw extruder having a screw diameter of 20 mm.

(d) The extruded melt is cooled using a cooling roll through which cooling water of 30° C. is passed to form a sheet having a thickness of 50 μm to 60 μm and a width of 60 mm to 70 mm.

A method of measuring the number of infusible particles is not particularly limited. For example, a calculation method of observing a surface of the sheet for measuring the number of infusible particles with a scanner, importing the obtained image to a computer, and performing binarization processing using commercially available image analysis software may be used. In this case, a surface image of the sheet for measuring the number of infusible particles is imported to a computer under conditions of 900 dpi and 8 bit, a portion having a threshold of 120 or more is distinguished as white, a portion having a threshold of less than 120 is distinguished as black, and the white portion can be counted as an infusible particle. A diameter of the infusible particle may be an equivalent circle diameter of the infusible particle.

The number of infusible particles is derived from the ethylene-propylene copolymer component (B) as described above, and the number of infusible particles can be reduced by polymerizing the propylene homopolymer component (A) by a multistage polymerization method described below, thereby obtaining a heterophasic propylene polymer material having an appearance suitable for non-coating applications. The number of infusible particles can be further reduced by changing various conditions during the polymerization. Examples of these conditions can include the number of reaction regions in the multistage polymerization method (for example, 6 to 10 reaction regions are preferred in the polymerization of the propylene homopolymer component (A)) and an average retention time of the polymer in a polymerization reactor in each step (details are described below).

Other Physical Properties

A melting temperature of the heterophasic propylene polymer material is preferably 155° C. or higher, and more preferably 160° C. or higher, from the viewpoint of rigidity of an obtained molded article. In general, the melting temperature is 175° C. or lower. The melting temperature is a peak temperature of an endothermic peak having the highest peak temperature in a differential scanning calorimetry curve measured with a differential scanning calorimeter during a temperature raising operation. The differential scanning calorimetry curve may be measured with the differential scanning calorimeter under the following conditions, and the melting temperature may be obtained from the differential scanning calorimetry curve during the temperature raising operation. For example, the melting temperature may be obtained under the following measurement conditions.

Temperature lowering operation: The heterophasic propylene polymer material is melted at 220° C., and then a temperature is lowered from 220° C. to −90° C. at a temperature lowering rate of 5° C./min.

Temperature raising operation: After the temperature lowing operation, the temperature is immediately raised from −90° C. to 200° C. at 5° C./min.

The melting temperature of the heterophasic propylene polymer material is preferably 155° C. or higher, and more preferably 160° C. or higher, from the viewpoint of a release property of a molded article at the time of injection molding. In general, the melting temperature is 175° C. or lower. Examples of measurement conditions of the melting temperature are as described above.

3. Production Method of Heterophasic Propylene Polymer Material

The heterophasic propylene polymer material according to an embodiment of the present invention is a polymer material obtained by a multistage polymerization method. Examples of a production method of the heterophasic propylene polymer material can include the following production methods 1 and 2.

Production Method 1: Production Method of Heterophasic Propylene Polymer Material Including Step (1-1) and Step (1-2)

Step (1-1): A step of homopolymerizing propylene in the presence of a propylene polymer catalyst by a multistage polymerization method to obtain a propylene homopolymer component (A)

Step (1-2): A step of copolymerizing ethylene, propylene, and if necessary, an α-olefin having 4 to 12 carbon atoms in the presence of the propylene homopolymer component (A) obtained in the above step by a multistage polymerization method to obtain a heterophasic propylene polymer material containing the propylene homopolymer component (A) and the ethylene-propylene copolymer component (B)

Production Method 2: Production Method of Heterophasic Propylene Polymer Material Including Step (2-1) and Step (2-2)

Step (2-1): A step of copolymerizing ethylene, propylene, and if necessary, an α-olefin having 4 to 12 carbon atoms in the presence of a propylene polymerization catalyst by a multistage polymerization method to obtain an ethylene-propylene copolymer component (B)

Step (2-2): A step of homopolymerizing propylene in the presence of the ethylene-propylene copolymer component (B) obtained in the above step by a multistage polymerization method to obtain a heterophasic propylene polymer material containing the propylene homopolymer component (A) and the ethylene-propylene copolymer component (B)

In the present invention, the multistage polymerization method is a polymerization method of polymerizing a monomer in the presence of a polymerization catalyst in a plurality of serially connected reaction regions. The polymerization method includes the following steps a to c. When the number of the serially connected reaction regions is three or more, steps corresponding to the following steps b and c are performed also in subsequent reaction regions after a third reaction region.

Step a: A step of feeding a polymerization catalyst and a monomer to a first reaction region on the most upstream side and polymerizing the monomer to obtain a polymer Step b: A step of transferring the polymer obtained in the first reaction region to a second reaction region connected to the first reaction region Step c: A step of feeding a monomer to the second reaction region and polymerizing the monomer in the presence of the polymer obtained in the first reaction region to obtain a polymer In the steps (1-1) and (2-2), a bulk polymerization method, a solvent polymerization method, a gas phase polymerization method, or the like may be used, these methods may be used in combination, and a combination of a bulk polymerization method and a gas phase polymerization method may be preferably used. In the step (1-2) or (2-1), a polymerization method is not particularly limited, and a gas phase polymerization method is preferably used.

Examples of the multistage polymerization can include a case of performing polymerization in a reaction apparatus in which a plurality of reactors having one reaction region in one reactor are serially connected, a case of performing polymerization in a reactor having a plurality of reaction regions in one reactor, and a case of performing polymerization in a reaction apparatus in which a reactor having one reaction region in one reactor and a reactor having a plurality of reaction regions in one reactor are connected to each other. An example of the reactor having the plurality of reaction regions in one reactor can include a multistage spouted bed type reactor.

In the multistage polymerization method, the number of reaction regions is not particularly limited. In the step (1-1) or (2-2) of the multistage polymerization method, that is, in the polymerization of the propylene homopolymer component (A), the number of reaction regions is preferably 6 to 10 from the viewpoint of reducing the number of infusible particle. In the step (1-2) or (2-1) of the multistage polymerization method, the number of reaction regions is preferably 2 to 5.

In a case where the polymerization is performed by gas phase polymerization, it is preferable that the step (1-2) or (2-1) is performed under an atmosphere having a hydrogen concentration of more than 0.4 mol % and 10 mol % or less. The hydrogen concentration is more preferably 0.5 to 5.0 mol %. As a result, a preferred intrinsic viscosity [η] of each of the heterophasic propylene polymer material, the propylene homopolymer component (A), and the ethylene-propylene copolymer component (B) according to an embodiment of the present invention is obtained.

In an embodiment of the present invention, in the component (B2), an ethylene gas concentration in the step (1-2) or (2-1) is preferably 40 to 70 mol %, more preferably 40 to 65 mol %, and still more preferably 43 to 55 mol %, with respect to a total of a propylene gas concentration and the ethylene gas concentration, from the viewpoint of the content of the monomer unit derived from the ethylene.

A polymerization temperature in the step (1-1) or (2-2) is preferably 30 to 100° C., more preferably 50 to 90° C., and still more preferably 60 to 90° C., from the viewpoint of the content of the component (B2) in the heterophasic propylene polymer material. In addition, a polymerization temperature in the step (1-2) or (2-1) is preferably 40 to 90° C., more preferably 50 to 90° C., and still more preferably 60 to 80° C., from the same viewpoint.

A polymerization pressure in the step (1-1) or (2-2) is preferably 0.5 to 10.0 MPa, more preferably 1.0 to 5.0 MPa, and still more preferably 1.5 to 4.0 MPa, from the viewpoint of the content of the component (B2) in the heterophasic propylene polymer material. In addition, a polymerization pressure in the step (1-2) or (2-1) is preferably 0.5 to 10.0 MPa, more preferably 0.7 to 5.0 MPa, and still more preferably 1.0 to 3.0 MPa, from the same viewpoint.

An average retention time of the polymer in the step (1-1) or (2-2) in the polymerization reactor is preferably 0.1 to 10.0 hr, more preferably 0.5 to 6.0 hr, and still more preferably 1.0 to 4.0 hr, from the viewpoint of the content of the component (B2) in the heterophasic propylene polymer material. An average retention time of the polymer in the step (1-2) or (2-1) in the polymerization reactor is preferably 0.1 to 10.0 hr, more preferably 0.5 to 6.0 hr, and still more preferably 1.0 to 4.0 hr, from the same viewpoint.

The average retention time of the polymer in the step (1-1) or (2-2) in the polymerization reactor is preferably 0.5 to 6.0 hr, and more preferably 1.0 to 4.0 hr, from the viewpoint of reducing the number of infusible particles. The average retention time of the polymer in the step (1-2) or (2-1) in the polymerization reactor is preferably 0.5 to 6.0 hr, and more preferably 1.0 to 4.0 hr, from the same viewpoint.

In an embodiment of the present invention, for example, a vessel type reactor can be used in the first stage of the multistage polymerization. A polymerization temperature can be, for example, 0 to 120° C. A polymerization pressure can be an atmospheric pressure to 10 MPaG.

Next, a gas phase reactor can be used, for example, in the second stage of the multistage polymerization. A polymerization temperature is preferably 40 to 80° C., and more preferably 40 to 75° C. A polymerization pressure is preferably an atmospheric pressure to 10 MPaG, and more preferably an atmospheric pressure to 2.0 MPaG.

Next, a gas phase reactor can be used, for example, in the third stage of the multistage polymerization. A polymerization temperature is preferably, for example, 0 to 120° C. A polymerization pressure is preferably an atmospheric pressure to 10 MPaG, and more preferably an atmospheric pressure to 2.0 MPaG. A hydrogen concentration is preferably, for example, 0.4 to 10 mol %.

Next, a gas phase reactor can be used, for example, in the fourth stage of the multistage polymerization. A polymerization temperature is preferably, for example, 0 to 120° C. A polymerization pressure is preferably an atmospheric pressure to 10 MPaG, and more preferably an atmospheric pressure to 2.0 MPaG. A hydrogen concentration is preferably, for example, 0.4 to 10 mol %.

In an embodiment of the present invention, an example of the propylene polymerization catalyst preferably used in the production method of the heterophasic propylene polymer material can include a propylene polymerization catalyst obtained by contacting a solid catalyst component and an organoaluminum compound to each other. In another embodiment of the present invention, an example of the propylene polymerization catalyst preferably used in the production method of the heterophasic propylene polymer material can include a propylene polymerization catalyst obtained by contacting a solid catalyst component, an organoaluminum compound, and an external electron donor to each other.

As the solid catalyst component, a solid catalyst component containing at least one internal electron donor selected from the group consisting of a monoester compound, an aliphatic dicarboxylic acid ester compound, a diol diester compound, a β-alkoxy ester compound, and a diether compound, a titanium atom, a magnesium atom, and a halogen atom, and satisfying the following requirements (i) to (iv) can be preferably used.

(i) A total volume of pores measured by a mercury intrusion method according to the standard ISO15901-1:2005 is 0.95 to 1.80 mL/g, and a specific surface area measured by a mercury intrusion method according to the standard ISO15901-1:2005 is 60 to 170 m$^2$/g.

(ii) A cumulative percentage of components having a particle size of 10 μm or less in a volume-based particle size distribution measured by a laser diffraction scattering method according to the standard ISO13320:2009 is 6.5% or less.

(iii) Among peak components obtained by waveform separation of peaks belonging to a is-orbit of an oxygen atom obtained by X-ray photoelectron spectroscopy (XPS) according to the standard ISO15472:2001, a ratio (G/F) of an area (G) of peak components having a peak top in a range of 529 eV or more and less than 532 eV of binding energy to an area (F) of peak components having a peak top in a range of 532 eV or more and 534 eV or less of binding energy is 0.33 or less.

(iv) A content of the titanium atom is 1.50 to 3.40 mass %.

Such a solid catalyst component can be produced, for example, by a method of producing a solid catalyst component, the method including a step of contacting a halogenated titanium compound solution containing a halogenated titanium compound and a solvent, and a magnesium compound to each other to obtain a slurry containing a solid product. In the step, a ratio (A/C) of A expressed by the following Equation (1) to C expressed by the following Equation (2) is 3 or less.

$$A = a/b \qquad (1)$$

$$C = a/c \qquad (2)$$

a: Volume (mL) of halogenated titanium compound contained in halogenated titanium compound solution b: Volume (mL) of solvent contained in halogenated titanium compound solution c: Volume (mL) of solvent contained in slurry containing solid product As the monoester compound used as the internal electron donor, an aromatic carboxylic acid ester compound or an aliphatic carboxylic acid ester compound is preferred. Examples of the aromatic carboxylic acid ester compound can include methyl benzoate, ethyl benzoate, propyl benzoate, butyl benzoate, pentyl benzoate, hexyl benzoate, octyl benzoate, methyl toluate, ethyl toluate, propyl toluate, butyl toluate, pentyl toluate, hexyl toluate, and octyl toluate. Examples of the aliphatic carboxylic acid ester compound can include methyl acetate, ethyl acetate, propyl acetate, butyl acetate, pentyl acetate, hexyl acetate, octyl acetate, methyl propionate, ethyl propionate, propyl propionate, butyl propionate, pentyl propionate, hexyl propionate, octyl propionate, methyl butyrate, ethyl butyrate, propyl butyrate, butyl butyrate, pentyl butyrate, hexyl butyrate, octyl butyrate, methyl valerate, ethyl valerate, propyl valerate, butyl valerate, pentyl valerate, hexyl valerate, octyl valerate, methyl caproate, ethyl caproate, propyl caproate, butyl caproate, pentyl caproate, hexyl caproate, octyl caproate, methyl enanthate, ethyl enanthate, propyl enanthate, butyl enanthate, pentyl enanthate, hexyl enanthate, octyl enanthate, methyl caprylate, ethyl caprylate, propyl caprylate, butyl caprylate, pentyl caprylate, hexyl caprylate, octyl caprylate, methyl pelargonate, ethyl pelargonate, propyl pelargonate, butyl pelargonate, pentyl pelargonate, hexyl pelargonate, octyl pelargonate, methyl caprate, ethyl caprate, propyl caprate, butyl caprate, pentyl caprate, hexyl caprate, octyl caprate, methyl laurate, ethyl laurate, propyl laurate, butyl laurate, pentyl laurate, hexyl laurate, octyl laurate, methyl myristate, ethyl myristate, propyl myristate, butyl myristate, pentyl myristate, hexyl myristate, octyl myristate, methyl palmitate, ethyl palmitate, propyl palmitate, butyl palmitate, pentyl palmitate, hexyl palmitate, octyl palmitate, methyl margarate, ethyl margarate, propyl margarate, butyl margarate, pentyl margarate, hexyl margarate, octyl margarate, methyl stearate, ethyl stearate, propyl stearate, butyl stearate, pentyl stearate, hexyl stearate, and octyl stearate.

Examples of the aliphatic dicarboxylic acid ester compound used as the internal electron donor can include dimethyl ethanedioate, diethyl ethanedioate, dipropyl ethanedioate, dibutyl ethanedioate, dipentyl ethanedioate, dihexyl ethanedioate, dioctyl ethanedioate, dimethyl propanedioate, diethyl propanedioate, dipropyl propanedioate, dibutyl propanedioate, dipentyl propanedioate, dihexyl propanedioate, dioctyl propanedioate, dimethyl butanedioate, diethyl butanedioate, dipropyl butanedioate, dibutyl butanedioate, dipentyl butanedioate, dihexyl butanedioate, dioctyl butanedioate, dimethyl pentanedioate, diethyl pentanedioate, dipropyl pentanedioate, dibutyl pentanedioate, dipentyl pentanedioate, dihexyl pentanedioate, dioctyl pentanedioate, dimethyl hexanedioate, diethyl hexanedioate, dipropyl hexanedioate, dibutyl hexanedioate, dipentyl hexanedioate, dihexyl hexanedioate, dioctyl hexanedioate, dimethyl (E)-but-2-enedioate, diethyl (E)-but-2-enedioate, dipropyl (E)-but-2-enedioate, dibutyl (E)-but-2-enedioate, dipentyl (E)-but-2-enedioate, dihexyl (E)-but-2-enedioate, dioctyl (E)-but-2-enedioate, dimethyl (Z)-but-2-enedioate, diethyl (Z)-but-2-enedioate, dipropyl (Z)-but-2-enedioate, dibutyl (Z)-but-2-enedioate, dipentyl (Z)-but-2-enedioate, dihexyl (Z)-but-2-enedioate, dioctyl (Z)-but-2-enedioate, dimethyl cyclohexane-1,2-dicarboxylate, diethyl cyclohexane-1,2-dicarboxylate, dipropyl cyclohexane-1,2-dicarboxylate, dibutyl cyclohexane-1,2-dicarboxylate, dipentyl cyclohexane-1,2-dicarboxylate, dihexyl cyclohexane-1,2-dicarboxylate, dioctyl cyclohexane-1,2-dicarboxylate, dimethyl 1,2-cyclohexene-1,2-dicarboxylate, diethyl 1,2-cyclohexene-1,2-dicarboxylate, dipropyl 1,2-cyclohexene-1,2-dicarboxylate, dibutyl 1,2-cyclohexene-1,2-dicarboxylate, dipentyl 1,2-cyclohexene-1,2-dicarboxylate, dihexyl 1,2-cyclohexene-1,2-dicarboxylate, dioctyl 1,2-cyclohexene-1,2-dicarboxylate, dimethyl 3-methylcyclohexane-1,2-dicarboxylate, diethyl 3-methylcyclohexane-1,2-dicarboxylate, dipropyl 3-methylcyclohexane-1,2-dicarboxylate, dibutyl 3-methylcyclohexane-1,2-dicarboxylate, dipentyl 3-methylcyclohexane-1,2-dicarboxylate, dihexyl 3-methylcyclohexane-1,2-dicarboxylate, dioctyl 3-methylcyclohexane-1,2-dicarboxylate, dimethyl 3,6-dimethylcyclohexane-1,2-dicarboxylate, diethyl 3,6-dimethylcyclohexane-1,2-dicarboxylate, dipropyl 3,6-dimethylcyclohexane-1,2-dicarboxylate, dibutyl 3,6-dimethylcyclohexane-1,2-dicarboxylate, dipentyl 3,6-dimethylcyclohexane-1,2-dicarboxylate, dihexyl 3,6-dimethylcyclohexane-1,2-dicarboxylate, and dioctyl 3,6-dimethylcyclohexane-1,2-dicarboxylate.

Examples of the diol diester compound used as the internal electron donor can include 1,2-dibenzoate propane, 1,2-diacetyloxypropane, 1,2-dibenzoate butane, 1,2-diacetyloxybutane, 1,2-dibenzoate cyclohexane, 1,2-diacetyloxycyclohexane, 1,3-dibenzoate propane, 1,3-diacetyloxypropane, 2,4-dibenzoate pentane, 2,4-diacetyloxypentane, 1,2-dibenzoate cyclopentane, 1,2-diacetyloxycyclopentane, 1,2-dibenzoate-4-tert-butyl-6-methylbenzene, 1,2-diacetyloxy-4-tert-butyl-6-methylbenzene, 1,3-dibenzoate 4-tert-butyl-6-methylbenzene, and 1,3-diacetyloxy-4-tert-butyl-6-methylbenzene.

Examples of the β-alkoxy ester compound used as the internal electron donor can include methyl 2-methoxymethyl-3,3-dimethylbutanoate, ethyl 2-methoxymethyl-3,3-dimethylbutanoate, propyl 2-methoxymethyl-3,3-dimethylbutanoate, butyl 2-methoxymethyl-3,3-dimethylbutanoate, pentyl 2-methoxymethyl-3,3-dimethylbutanoate, hexyl 2-methoxymethyl-3,3-dimethylbutanoate, octyl 2-methoxymethyl-3,3-dimethylbutanoate, methyl 3-methoxy-2-phenylpropionate, ethyl 3-methoxy-2-phenylpropionate, propyl 3-methoxy-2-phenylpropionate, butyl 3-methoxy-2-phenylpropionate, pentyl 3-methoxy-2-phenylpropionate, hexyl 3-methoxy-2-phenylpropionate, octyl 3-methoxy-2-phenylpropionate, methyl 2-ethoxymethyl-3,3-dimethylbutanoate, ethyl 2-ethoxymethyl-3,3-dimethylbutanoate, propyl 2-ethoxymethyl-3,3-dimethylbutanoate, butyl 2-ethoxymethyl-3,3-dimethylbutanoate, pentyl 2-ethoxymethyl-3,3-dimethylbutanoate, hexyl 2-ethoxymethyl-3,3-dimethylbutanoate, octyl 2-ethoxymethyl-3,3-dimethylbutanoate, methyl 3-ethoxy-2-phenylpropionate, ethyl 3-ethoxy-2-phenylpropionate, propyl 3-ethoxy-2-phenylpropionate, butyl 3-ethoxy-2-phenylpropionate, pentyl 3-ethoxy-2-phenylpropionate, hexyl 3-ethoxy-2-phenylpropionate, octyl 3-ethoxy-2-phenylpropionate, methyl 2-propyloxymethyl-3,3-dimethylbutanoate, ethyl 2-propyloxymethyl-3,3-dimethylbutanoate, propyl 2-propyloxymethyl-3,3-dimethylbutanoate, butyl 2-propyloxymethyl-3,3-dimethylbutanoate, pentyl 2-propyloxymethyl-3,3-dimethylbutanoate, hexyl 2-propyloxymethyl-3,3-dimethylbutanoate, octyl 2-propyloxymethyl-3,3-dimethylbutanoate, methyl 3-propyloxy-2-phenylpropionate, ethyl 3-propyloxy-2-phenylpropionate, propyl 3-propyloxy-2-phenylpropionate, butyl 3-propyloxy-2-phenylpropionate, pentyl 3-propyloxy-2-phenylpropionate, hexyl 3-propyloxy-2-phenylpropionate, octyl 3-propyloxy-2-phenylpropionate, methyl 2-methoxybenzenecarboxylate, ethyl 2-methoxybenzenecarboxylate, propyl 2-methoxybenzenecarboxylate, butyl 2-methoxybenzenecarboxylate, pentyl 2-methoxybenzenecarboxylate, hexyl 2-methoxybenzenecarboxylate, octyl 2-methoxybenzenecarboxylate, methyl 2-ethoxybenzenecarboxylate, ethyl 2-ethoxybenzenecarboxylate, propyl 2-ethoxybenzenecarboxylate, butyl 2-ethoxybenzenecarboxylate, pentyl 2-ethoxybenzenecarboxylate, hexyl 2-ethoxybenzenecarboxylate, and octyl 2-ethoxybenzenecarboxylate.

Examples of the diether compound used as the internal electron donor can include 1,2-dimethoxypropane, 1,2-diethoxypropane, 1,2-dipropyloxypropane, 1,2-dibutoxypropane, 1,2-di-tert-butoxypropane, 1,2-diphenoxypropane, 1,2-dibenzyloxypropane, 1,2-dimethoxybutane, 1,2-diethoxybutane, 1,2-dipropyloxybutane, 1,2-dibutoxybutane, 1,2-di-tert-butoxybutane, 1,2-diphenoxybutane, 1,2-dibenzyloxybutane, 1,2-dimethoxycyclohexane, 1,2-diethoxycyclohexane, 1,2-dipropyloxycyclohexane, 1,2-dibutoxycyclohexane, 1,2-di-tert-butoxycyclohexane, 1,2-diphenoxycyclohexane, 1,2-dibenzyloxycyclohexane, 1,3-dimethoxypropane, 1,3-diethoxypropane, 1,3-dipropyloxypropane, 1,3-dibutoxypropane, 1,3-di-tert-butoxypropane, 1,3-diphenoxypropane, 1,3-dibenzyloxypropane, 2,4-dimethoxypentane, 2,4-diethoxypentane, 2,4-dipropyloxypentane, 2,4-dibutoxypentane, 2,4-di-tert-butoxypentane, 2,4-diphenoxypentane, 2,4-dibenzyloxypentane, 1,2-dimethoxycyclopentane, 1,2-diethoxycyclopentane, 1,2-dipropyloxycyclopentane, 1,2-dibutoxycyclopentane, 1,2-di-tert-butoxycyclopentane, 1,2-diphenoxycyclopentane, 1,2-dibenzyloxycyclopentane, 9,9-bis(methoxymethyl)fluorene, 9,9-bis(ethoxymethyl)fluorene, 9,9-bis(propyloxymethyl)fluorene, 9,9-bis(butoxymethyl)fluorene, 9,9-bis-tert-butoxymethylfluorene, 9,9-bis(phenoxymethyl)fluorene, 9,9-bis(benzyloxymethyl)fluorene, 1,2-dimethoxybenzene, 1,2-diethoxybenzene, 1,2-dipropyloxybenzene, 1,2-dibutoxybenzene, 1,2-di-tert-butoxybenzene, 1,2-diphenoxybenzene, and 1,2-dibenzyloxybenzene.

In addition, internal electron donors described in JP-A-2011-246699 can also be applied. The internal electron donors are preferably a dicarboxylic acid ester compound, a diol diester compound, and a β-alkoxy ester compound. These internal electron donors may be independently used alone or in combination of two or more thereof.

An example of the organoaluminum compound can include compounds described in JP-A-10-212319. Among them, trialkylaluminum, a mixture of trialkylaluminum and dialkylaluminum halide, or alkylalumoxane is preferred, and triethylaluminum, triisobutylaluminum, a mixture of triethylaluminum and diethylaluminum chloride, or tetraethyldialumoxane is more preferred.

Examples of the external electron donor can include compounds described in Japanese Patent No. 2950168, JP-A-2006-96936, JP-A-2009-173870, and JP-A-2010-168545. Among them, an oxygen-containing compound or a nitrogen-containing compound is preferred. Examples of the oxygen-containing compound can include alkoxysilicon, ether, ester, and ketone. Among them, alkoxysilicon or ether is preferable, and examples thereof can include cyclohexylmethyldimethoxysilane, cyclohexylethyldimethoxysilane, diisopropyldimethoxysilane, tert-butylethyldimethoxysilane, tert-butyl-n-propyldimethoxysilane, phenyltrimethoxysilane, diphenyldimethoxysilane, dicyclobutyldimethoxysilane, dicyclopentyldimethoxysilane, tetraethoxysilane, methyltriethoxysilane, ethyltriethoxysilane, iso-butyltriethoxysilane, vinyltriethoxysilane, sec-butyltriethoxysilane, cyclohexyltriethoxysilane, and cyclopentyltriethoxysilane.

As the solvent used in the method of producing a solid catalyst component, inactive hydrocarbons such as propane, butane, isobutane, pentane, isopentane, hexane, heptane, octane, cyclohexane, benzene, and toluene are preferred.

The production method of the heterophasic propylene polymer material according to an embodiment of the present invention may further include polymerizing a small amount of olefin in the presence of a solid catalyst component and an organoaluminum compound to generate a catalyst component having a surface covered with an olefin polymer (the polymerization is usually called a preliminary polymerization; hence, the catalyst component is usually called a preliminary polymerization catalyst component). The olefin used in the preliminary polymerization is at least one of olefins used as a raw material of the heterophasic propylene polymer material in a main polymerization. In the preliminary polymerization, in order to adjust a molecular weight of the olefin polymer to be generated, a chain transfer agent such as hydrogen may be used, or an external electron donor may be used.

In an aspect of the present invention, in the preliminary polymerization, the amount of the organoaluminum compound is preferably 0.1 to 700 moles, and more preferably 0.2 to 200 moles, per 1 mole of a transition metal atom contained in the solid catalyst component. In addition, the amount of the external electron donor is preferably 0.01 to 400 moles per 1 mole of the transition metal atom contained in the solid catalyst component. The amount of the solid catalyst component contained per 1 L of a solvent is preferably 1 to 500 g. The amount of olefin to be preliminarily polymerized is usually 0.1 to 200 g per 1 g of the solid catalyst component.

4. Use of Heterophasic Propylene Polymer Material Thermoplastic Elastomer Composition A thermoplastic elastomer composition according to an embodiment of the present invention contains the heterophasic propylene polymer material and an ethylene-α-olefin copolymer containing a monomer unit derived from ethylene and a monomer unit derived from an α-olefin having 4 to 10 carbon atoms. The thermoplastic elastomer composition according to an embodiment of the present invention can contain a crosslinked product obtained by three-dimensionally crosslinking the heterophasic propylene polymer material by a crosslinking agent and a crosslinking aid. The crosslinking agent and the crosslinking aid can be appropriately selected by those skilled in the art.

A content of the ethylene-α-olefin copolymer in the thermoplastic elastomer composition is preferably 5 parts by mass or more, more preferably 6 parts by mass or more, and still more preferably 9 parts by mass or more, with respect to 100 parts by mass of a content of the heterophasic propylene polymer material. In addition, the content is preferably 20 parts by mass or less, more preferably 13 parts by mass or less, and still more preferably 12 parts by mass or less.

The content of the ethylene-α-olefin copolymer in the thermoplastic elastomer composition is preferably 5 parts by mass or more, and more preferably 7 parts by mass or more, with respect to 100 parts by mass of a total content of the heterophasic propylene polymer material and the ethylene-α-olefin copolymer. In addition, the content is preferably 15 parts by mass or less and more preferably 13 parts by mass or less.

A mass average molecular weight of the ethylene-α-olefin copolymer contained in the thermoplastic elastomer composition is preferably 10,000 to 1,000,000, more preferably 30,000 to 800,000, and still more preferably 50,000 to 600,000.

Examples of the α-olefin having 4 to 10 carbon atoms can include 1-butene, 1-pentene, 1-hexene, 1-heptene, 1-octene, 1-nonene, 1-decene, 3-methyl-1-butene, 3-methyl-1-pentene, 4-methyl-1-pentene, 2-ethyl-1-hexene, and 2,2,4-trimethyl-1-pentene.

A melt flow rate (MFR) of the thermoplastic elastomer composition measured according to JIS K7210 at a temperature of 230° C. and a measurement load of 21.18 N is preferably 1 g/10 min to 50 g/10 min, and more preferably 5 g/10 min to 30 g/10 min, from the viewpoint of an appearance of an obtained molded article.

Other Components

The thermoplastic elastomer composition may further contain at least one release agent selected from the compound group consisting of a fatty acid having 5 or more carbon atoms, a metal salt of a fatty acid having 5 or more carbon atoms, an amide of a fatty acid having 5 or more carbon atoms, and an ester of a fatty acid having 5 or more carbon atoms, from the viewpoint of imparting the release property for the purpose of improving production stability in the injection molding.

Examples of the fatty acid having 5 or more carbon atoms can include lauric acid, palmitic acid, stearic acid, behenic acid, oleic acid, erucic acid, linoleic acid, and ricinoleic acid.

Examples of the metal salt of the fatty acid having 5 or more carbon atoms can include a salt of the fatty acid and a metal such as Li, Na, Mg, Al, K, Ca, Zn, Ba, or Pb, and specifically, lithium stearate, sodium stearate, calcium stearate, and zinc stearate.

Examples of the amide of the fatty acid having 5 or more carbon atoms can include lauric acid amide, palmitic acid amide, stearic acid amide, oleic acid amide, erucic acid amide, methylenebisstearic acid amide, ethylenebisstearic acid amide, ethylenebisoleic acid amide, and stearyldiethanolamide. Among them, erucic acid amide is preferred.

An example of the ester of the fatty acid having 5 or more carbon atoms can include an ester of the following alcohol and the fatty acid. That is, examples of the alcohol can include aliphatic alcohol such as myristyl alcohol, palmityl alcohol, stearyl alcohol, behenyl alcohol, or 12-hydroxystearyl alcohol; aromatic alcohol such as benzyl alcohol, β-phenylethyl alcohol, or phthalyl alcohol; and polyhydric alcohol such as glycerin, diglycerin, polyglycerin, sorbitan, sorbitol, propylene glycol, polypropylene glycol, polyethylene glycol, pentaerythritol, or trimethylolpropane. More specifically, examples of the alcohol can include glycerin monooleate, glycerin dioleate, polyethylene glycol monostearate, and citric acid distearate.

A content of the release agent is preferably 0.01 to 1.5 parts by mass, more preferably 0.05 to 1.0 part by mass, and still more preferably 0.10 to 0.50 parts by mass, with respect to 100 parts by mass of the heterophasic propylene polymer material, from the viewpoint of a balance between the release property after the injection molding and an appearance of a surface of a molded article.

The thermoplastic elastomer composition may also contain an inorganic filler such as talc, calcium carbonate, calcined kaolin, or hydrotalcite, an organic filler such as fiber, wood powder, or cellulose powder, a lubricant such as silicone oil or silicone gum, an antioxidant, a weathering stabilizer, an ultraviolet absorber, a heat stabilizer, a light stabilizer, a pigment, a nucleating agent, or an adsorbent, within a range in which the effects of the present invention are not impaired.

Method of Producing Thermoplastic Elastomer Composition

A method of producing the thermoplastic elastomer composition according to an embodiment of the present invention includes melting and kneading the heterophasic propylene polymer material in the presence of a crosslinking agent and a crosslinking aid.

Here, the producing of the heterophasic propylene polymer material and the producing of the thermoplastic elastomer composition do not necessarily need to be sequentially performed, but are preferably sequentially performed. That is, the method of producing the thermoplastic elastomer composition according to an embodiment of the present invention can include a mode of obtaining the heterophasic propylene polymer material as a commercially available material and melting and kneading the heterophasic propylene polymer material in the presence of a crosslinking agent and a crosslinking aid.

A temperature at which the melting and kneading are performed varies depending on types of the crosslinking agent and the crosslinking aid to be added. However, a temperature at which each of the components after the melting and kneading can be sufficiently crosslinked is preferably, for example, 170 to 270° C., and more preferably 180 to 250° C.

A period of time for which the melting and kneading are performed varies depending on the types of the crosslinking agent and the crosslinking aid to be added. However, a period of time for which each of the components after the melting and kneading can be sufficiently crosslinked is preferably, for example, 0.1 to 5.0 minutes, and more preferably 0.3 to 2.0 minutes.

A molding temperature at the time of the injection molding is generally 150 to 300° C., preferably 180 to 280° C., and more preferably 200 to 250° C. A temperature of a mold is generally 0 to 100° C., preferably 20 to 90° C., more preferably 40 to 80° C., and still more preferably 50 to 75° C.

Molded Article

A molded article according to an embodiment of the present invention contains a heterophasic propylene polymer material or a thermoplastic elastomer composition. For example, the molded article can be obtained by melting and kneading and solidification-extrusion molding or injection molding a heterophasic propylene polymer material and an ethylene-α-olefin copolymer. Various conditions of the melting and kneading and molding may be appropriately set, and various additives can be used, if necessary.

The thermoplastic elastomer composition according to an embodiment of the present invention can be molded into a shape having a portion (thin portion) having a thickness different from those of other portions, can prevent gloss unevenness from being generated in the portion, and can produce a molded article having an appearance suitable for non-coating applications. Therefore, the thermoplastic elastomer composition can be preferably used for a molded article such as an airbag cover of an airbag provided in an automobile interior part such as an instrument panel or a pillar, an automobile exterior part such as a mold, a household appliance member, a constructional member, furniture, or general merchandise.

Hereinafter, an embodiment of the present invention will be further described in detail with examples. As a matter of course, the present invention is not limited to the following examples, and details of these examples can be variously modified. Further, the present invention is not limited to the description of the above-described embodiments, but may be altered by those skilled in the art within the scope of the claims. An embodiment based on an appropriate combination of technical means disclosed in different embodiments is encompassed in the technical scope of the present invention. In addition, all the documents described in the present specification can be cited as references.

EXAMPLES

Example 1

Production of Solid Catalyst Component

Step (1-1): A 100 mL flask equipped with a stirrer, a dropping funnel, and a thermometer was purged with nitrogen, 36.0 mL of toluene and 22.5 mL of titanium tetrachloride were added to the flask, and then stirring was performed, thereby obtaining a titanium tetrachloride solution. The temperature in the flask was adjusted to 0° C., 1.88 g of magnesium diethoxide was added at the same temperature four times every 30 minutes, and then stirring was performed at 0° C. for 1.5 hours. Next, 0.60 mL of ethyl 2-ethoxymethyl-3,3-dimethylbutanoate was added to the flask, and then the temperature in the flask was raised to 10° C. Thereafter, stirring was performed at the same temperature for 2 hours, and then 9.8 mL of toluene was added. Next, the temperature in the flask was raised, 3.15 mL of ethyl 2-ethoxymethyl-3,3-dimethylbutanoate was added to the flask at the time of 60° C., and then the temperature was raised to 110° C. The mixture in the flask was stirred at the same temperature for 3 hours. The obtained mixture was subjected to solid-liquid separation to obtain a solid. The obtained solid was washed with 56.3 mL of toluene at 100° C. three times.

Step (1-2): 38.3 mL of toluene was added to the washed solid obtained in the step (1-1) to prepare a slurry. To the slurry, 15.0 mL of titanium tetrachloride and 0.75 mL of ethyl 2-ethoxymethyl-3,3-dimethylbutanoate were added to prepare a mixture, and then the mixture was stirred at 110° C. for 1 hour. Next, the stirred mixture was subjected to solid-liquid separation, the obtained solid was washed with 56.3 mL of toluene at 60° C. three times and further washed with 56.3 mL of hexane at room temperature three times, and then the washed solid was dried under reduced pressure, thereby obtaining a solid catalyst component.

In the solid catalyst component, a content of a titanium atom was 2.53 mass %, a content of an ethoxy group was 0.44 mass %, and a content of an internal electron donor was 13.7 mass %.

Further, a center particle size in a particle size distribution on a volume basis measured by a laser diffraction scattering method was 59.5 μm, and a cumulative percentage of components having a particle size of 10 μm or less in the particle size distribution was 5.3%.

The amount of peak components derived from a is-orbit of an oxygen atom obtained by XPS and having a peak top in a range of 532 to 534 eV of binding energy was 85.0%. The amount of the peak components having a peak top in a range of 529 eV or more and less than 532 eV of binding energy was 15.0%.

A total volume of pores measured by a mercury intrusion method was 1.43 mL/g, the total volume of the pores having a pore radius in a range of 5 to 30 nm was 0.160 mL/g, the total volume of the pores having a pore radius in a range of 30 to 700 nm was 0.317 mL/g, and a specific surface area was 107.44 m$^2$/g.

Production of Heterophasic Propylene Polymer Material (I)

Preliminary Polymerization (2-1)

A SUS autoclave having an internal volume of 3 L equipped with a stirrer was charged with 1.0 L of sufficiently dehydrated and deaerated n-hexane, 35 mmol of triethylaluminum (hereinafter, described as a "TEA"), and 3.5 mmol of t-butyl-n-propyldimethoxysilane (electron donor component). Into the SUS autoclave, 9 g of the solid catalyst component produced in Production of solid catalyst component was added, and 9 g of propylene was sequentially fed over a period of about 30 minutes while keeping the temperature in the autoclave at about 10° C., thereby performing preliminary polymerization. Next, a slurry subjected to the preliminary polymerization was transferred to a SUS316L autoclave having an internal volume of 150 L equipped with a stirrer, and 100 L of liquid butane was added thereto, thereby obtaining a slurry of a preliminary polymerization catalyst component.

Main Polymerization (2-2)

By using a reaction apparatus in which a slurry polymerization reactor and three gas phase reactors were serially disposed, a propylene homopolymer component (A-I) was produced in the following polymerization steps (2-2-1) and (2-2-2), and transferred to the subsequent stage without deactivating the produced propylene homopolymer component (A-I). In addition, an ethylene-propylene copolymer component (B-I) was produced in the following polymerization steps (2-2-3) and (2-2-4).

Bulk Polymerization in Polymerization Step (2-2-1)

Homopolymerization of propylene was performed using a SUS304 vessel type reactor equipped with a stirrer. That is, propylene, hydrogen, triethylaluminum, t-butyl-n-propyldimethoxysilane, and the slurry of the preliminary polymerization catalyst component produced in the preliminary polymerization (2-1) were sequentially fed to the reactor, and then the polymerization reaction was performed, thereby obtaining propylene homopolymer particles. The reaction conditions were as follows.

Polymerization temperature: 50° C.
Stirring rate: 150 rpm
Liquid level of reactor: 18 L
Feeding amount of propylene: 20.0 kg/hr
Feeding amount of hydrogen: 56.0 NL/hr
Feeding amount of triethylaluminum: 42.3 mmol/hr
Feeding amount of t-butyl-n-propyldimethoxysilane: 8.38 mmol/hr
Feeding amount of slurry of preliminary polymerization catalyst component (in terms of polymerization catalyst component): 0.66 g/hr
Polymerization pressure: 3.95 MPa (gauge pressure)
Average retention time: 0.55 hr Gas Phase Polymerization in Polymerization Step (2-2-2)

A multistage gas phase polymerization reactor having 6-stage reaction regions in a vertical direction in which the top stage was a fluidized bed and the remaining 5 stages were spouted beds was prepared. A slurry containing propylene homopolymer particles was sequentially fed from the vessel type reactor in the polymerization step (2-2-1) to the fluidized bed which was located at the top stage of the multistage gas phase polymerization reactor without deactivation.

In the multistage gas phase polymerization reactor, an inter-stage transfer of the propylene homopolymer particles obtained in each stage through the gas phase polymerization was performed in a double valve manner. In this transfer method, a reaction region of an upper stage and a reaction region of a lower stage are connected by a pipe of 1 inch, two on-off valves are provided in the pipe, an upper valve is opened in a state in which a lower valve is closed, powder is accumulated between the valves from the reaction region of the upper stage, and then the lower valve is opened after closing the upper valve, thereby transferring the polypropylene particles to the reaction region of the lower stage.

Propylene and hydrogen were sequentially fed from a lower part of the multistage gas phase polymerization reactor having the above configuration. By doing so, the fluidized bed or the spouted bed was formed in each reaction region, the feeding amounts of propylene and hydrogen were controlled so as to keep a gas composition and a pressure constant, and homopolymerization of propylene was further performed in the presence of the propylene homopolymer particles while purging an excess gas, thereby producing a propylene homopolymer component (A-I). The reaction conditions were as follows.

Polymerization temperature: 70° C.
Polymerization pressure: 1.40 MPa (gauge pressure)
In the multistage gas phase polymerization reactor, a gas concentration ratio of hydrogen/(hydrogen+propylene) in the reactor was 9.9 mol %, and an average retention time of the polymer in the polymerization reactor was 3.4 hr.

The obtained propylene homopolymer component (A-I) was partially sampled for evaluation, and then a next polymerization step (2-2-3) was performed.

Gas Phase Polymerization in Polymerization Step (2-2-3)

Particles of the propylene homopolymer component (A-I) discharged from the multistage gas phase polymerization reactor in the polymerization step (2-2-2) were sequentially fed to a fluidized bed type reactor. The fluidized bed type reactor was provided with a gas dispersion plate, and the transfer of the particles of the propylene homopolymer component (A-I) from the multistage gas phase polymerization reactor of the former stage to the fluidized bed type reactor was performed in a double valve manner.

Propylene, ethylene, and hydrogen were sequentially fed to the fluidized bed type reactor having the above configuration, the gas feeding amount was controlled so as to keep a gas composition and a pressure constant, and copolymerization of propylene and ethylene was performed in the presence of the particles of the propylene homopolymer component (A-I) while purging an excess gas. The reaction conditions were as follows.

Polymerization temperature: 70° C.
Polymerization pressure: 1.37 MPa (gauge pressure)
In the fluidized bed type reactor, in a concentration ratio of gas in the reactor, a ratio of ethylene/(propylene+ethylene) was 51.4 mol %, and a ratio of hydrogen/(hydrogen+propylene+ethylene) was 3.08 mol %. The average retention time of the polymer in the polymerization reactor was 1.6 hr.

Gas Phase Polymerization in Polymerization Step (2-2-4)

Particles of the ethylene-propylene copolymer component discharged from the fluidized bed type reactor in the polymerization step (2-2-3) were further sequentially fed to a fluidized bed type reactor of the subsequent stage. Similarly to the fluidized bed type reactor in the polymerization step (2-2-3), the fluidized bed type reactor in a polymerization step (2-2-4) was provided with a gas dispersion plate, and the transfer of the particles of the ethylene-propylene copolymer component from the fluidized bed type reactor in the polymerization step (2-2-3) to the fluidized bed type reactor in the polymerization step (2-2-4) was performed in a double valve manner.

Copolymerization of propylene and ethylene was performed to obtain a heterophasic propylene polymer material (I) containing the propylene homopolymer component (A-I) and the ethylene-propylene copolymer component (B-I), in the same manner as that in the polymerization step (2-2-3) except for the following conditions.

Polymerization temperature: 70° C.
Polymerization pressure: 1.32 MPa (gauge pressure)
In the fluidized bed type reactor, in a concentration ratio of gas in the reactor, a ratio of ethylene/(propylene+ethylene) was 51.4 mol %, and a ratio of hydrogen/(hydrogen+propylene+ethylene) was 3.08 mol %. The average retention time of the polymer in the polymerization reactor was 0.57 hr.

Composition and Physical Properties of Heterophasic Propylene Polymer Material (I)

(1) Measurement of Contents of Propylene Homopolymer Component (A-I) and Ethylene-Propylene Copolymer Component (B-I)

A total crystal melting heat quantity of the propylene homopolymer component (A-I) and the heterophasic propylene polymer material (I) was measured, and a content $(X_{A-I})$ of the propylene homopolymer component (A-I) and a content $(X_{B-I})$ of the ethylene-propylene copolymer component (B-I) in the obtained heterophasic propylene polymer material (I) were calculated by using the following equations. The crystal melting heat quantity was measured by differential scanning calorimetry (DSC).

In the condition of the differential scanning calorimetry (DSC), first, as a 1$^{st}$ run (first scanning), a temperature was raised from 50° C. to 220° C. at 200° C./min and held at 220° C. for 5 minutes. Next, the temperature was lowered from 220° C. to 180° C. at 70° C./min and held at 180° C. for 1 minute. Next, the temperature was lowered from 180° C. to 50° C. at 150° C./min and held at 50° C. for 2 minutes (temperature lowering step). Next, as a 2$^{nd}$ run (second scanning), the temperature was raised from 50° C. to 185° C. at 16° C./min. An endothermic peak of the heterophasic propylene polymer material or the propylene homopolymer component at the time of the 2$^{nd}$ run was measured, and the following $(\Delta Hf)_T$ and $(\Delta Hf)_{A-I}$ were calculated from the obtained peak area. It should be noted that the amount of sample used in the differential scanning calorimetry (DSC) per one time is about 5 mg.

$X_{A-I}=(\Delta Hf)_T/(\Delta Hf)_{A-I}$ $X_{B-I}=1-(\Delta Hf)_T/(\Delta Hf)_{A-I}$ $(\Delta Hf)_T$: Melting heat quantity (J/g) of propylene homopolymer component (A-I) contained in entire heterophasic propylene polymer material (I)

$(\Delta Hf)_{A-I}$: Melting heat quantity (J/g) of propylene homopolymer component (A-I)

In the differential scanning calorimetry (DSC) under the above conditions, the endothermic peak of the ethylene-propylene copolymer component (B-I) is not substantially shown. Therefore, the peak area for calculating $(\Delta Hf)_T$ corresponds to a peak area derived from the propylene homopolymer component (A-I) contained in the entire heterophasic propylene polymer material (I). Therefore, $(\Delta Hf)_T$ corresponds to the melting heat quantity of the propylene homopolymer component (A-I) contained in the entire heterophasic propylene polymer material (I), the melting heat quantity of the propylene homopolymer component (A-I) being calculated by measuring the melting heat quantity of the entire heterophasic propylene polymer material (I).

A content of the propylene homopolymer component (A-I) and a content of the ethylene-propylene copolymer component (B-I) were 47.5 mass % and 52.5 mass %, respectively, with respect to 100 mass % of a total content of the propylene homopolymer component (A-I) and the ethylene-propylene copolymer component (B-I) based on $(X_{A-I})$ and $(X_{B-I})$.

(2) In Ethylene-Propylene Copolymer Component (B-I), Measurement of Content $(Y_{B-I})$ of Monomer Unit Derived from Ethylene in Ethylene-Propylene Copolymer Component (B-I)

An infrared absorption spectrum of the heterophasic propylene polymer material (I) was measured by an FT-IR5200 (manufactured by JASCO Corporation). A content of a monomer unit derived from ethylene in the heterophasic propylene polymer material (I) was calculated from the obtained infrared absorption spectrum by using the following equation.

$Y_{B-I}=(T-C2')/X_{B-I}$(mass %)

T–C2': Content of monomer unit derived from ethylene in heterophasic propylene polymer material T–C2' was quantified according to a method described in Polymer Analysis Handbook (written by Research Committee of Polymer Analysis of the Japan Society for Analytical Chemistry, issued by KINOKUNIYA COMPANY LTD.).

1) From a density $(\rho(g/cm^3))$ and a thickness (t (cm)) of a measurement sample of an infrared absorption spectrum, an absorbance $A'_{736}$ in a wave number of 736 cm$^{-1}$, and an absorbance $A'_{722}$ in a wave number of 722 cm$^{-1}$, an apparent absorption coefficient $(K'_{736})_a$ in the wave number of 736 cm$^{-1}$, and an apparent absorption coefficient $(K'_{722})_a$ in the wave number of 722 cm$^{-1}$ were calculated by the following equations. The density of the measurement sample of the infrared absorption spectrum was 0.9 g/cm$^3$. In addition, the thickness of the measurement sample of the infrared absorption spectrum measured with a commercially available digital thickness meter (contact type thickness meter, trade name: Ultra-High Precision DegiMicro Head MH-15M, manufactured by Nippon Kogaku, K.K.) was 0.02 cm.

$(K'_{736})_a=A'_{736}/(\rho t)$ $(K'_{722})_a=A'_{722}/(\rho t)$

2) An absorption coefficient $(K'_{736})_c$ after correction in a wave number of 736 cm$^{-1}$ and an absorption coefficient $(K'_{722})_c$ after correction in a wave number of 722 cm$^{-1}$ were calculated by the following equations.

$$(K'_{736})_c = 1/0.96\{(K'_{736})_a - 0.268(K'_{722})_a\}$$

$$(K'_{722})_c = 1/0.96\{(K'_{722})_a - 0.150(K'_{736})_a\}$$

3) T–C2' (mass %) was calculated by the following equation.

$$T-C2' = 0.575\{(K'_{722})_c + (K'_{736})_c\}$$

$X_{B\text{-}I}$: Content (mass %) of ethylene-propylene copolymer component (B-I) in entire heterophasic propylene polymer material $Y_{B\text{-}I}$: Content (mass %) of monomer unit derived from ethylene in ethylene-propylene copolymer component (B-I)

A content ($Y_{B\text{-}I}$) of a monomer unit derived from ethylene was 40.8 mass % with respect to 100 mass % of a total content of a monomer unit derived from propylene and the monomer unit derived from the ethylene.

(3) Measurement of Contents of Ethylene-Propylene Copolymer Components Contained in Heterophasic Propylene Polymer Material (I) and Content of Monomer Unit Derived from Ethylene Contained in these Ethylene-Propylene Copolymer Components $X_{B1\text{-}I}$: Content of ethylene-propylene copolymer component (B1-I)

$X_{B2\text{-}I}$: Content of ethylene-propylene copolymer component (B2-I)

$Y_{B1\text{-}I}$: Content of monomer unit derived from ethylene in ethylene-propylene copolymer component (B1-I)

$Y_{B2\text{-}I}$: Content of monomer unit derived from ethylene in ethylene-propylene copolymer component (B2-I)

The measurement conditions were as follows.
Apparatus: Automated 3D analyzer CFC-2, manufactured by Polymer Characterization, S.A.
Graphite-filled column: Hypercarb column for high temperature (inner diameter 10 mm×length 50 mm, 35005-059046) manufactured by Thermo Fisher Scientific Inc.
Solvent and GPC mobile phase: Ortodichlorobenzene containing 0.05 wt % BHT (special grade, Wako Pure Chemical Industries, Ltd.)
Sample solution concentration: Sample 20 mg/orthodichlorobenzene 20 ml
Injection amount to graphite-filled column: 0.5 ml
Rate of GPC mobile phase: 1.0 ml/min
GPC column: Three columns of Tosoh TSKgel GMHHR-H(S)HT2
Detector: Infrared spectrophotometer IR5, manufactured by Polymer Characterization, S.A.
Calibration of GPC column: 1 mg of each of standard polystyrenes (manufactured by Tosoh Corporation) was weighed, the standard polystyrenes were combined each other as shown in Table 1, 20 ml of orthodichlorobenzene (the same composition as that of the GPC mobile phase) was added to each standard polystyrene, dissolution was performed at 145° C. for 1 hour, the obtained solutions were subjected to GPC analysis, and calibration was performed by creating a calibration curve from a relationship between a molecular weight and a peak top elution time of each standard polystyrene.

TABLE 1

| Table 1: Combination of standard polystyrenes | |
|---|---|
| Combination 1 | F850, F80, F1 |
| Combination 2 | F288, F10, A2500 |
| Combination 3 | F80, F4, A1000 |
| Combination 4 | F40, F2, A500 |

20 mg of a sample of the heterophasic propylene polymer material (I) was heated and stirred in 20 ml of orthodichlorobenzene containing 0.05 wt % BHT at 160° C. for 60 minutes to prepare a sample solution having a concentration of 1.0 mg/ml. 0.5 ml of the sample solution was injected into a graphite-filled column held at 160° C. in a TG-IC apparatus and held for 20 minutes. Next, a temperature of the graphite-filled column was lowered to 115° C. at a rate of 20° C./min and held at 115° C. for 20 minutes. Next, an elution amount at 115° C. was measured by gel permeation chromatography (GPC, embedded in the TG-IC apparatus) equipped with an infrared spectrophotometer. Subsequently, the temperature of the graphite-filled column was raised to 119° C. at a rate of 20° C./min and held for about 19 minutes, and then the elution amount at 119° C. was measured by GPC. The temperature of the graphite-filled column was sequentially raised to 123° C., 127° C., 131° C., 135° C., 139° C., 143° C., 147° C., 151° C., 155° C., and 160° C. to measure the elution amount from the heterophasic propylene polymer material (I) under each temperature condition. A ratio (mass %) of an elution amount ($W_{119° C.}$) at 119° C. or higher to a total elution amount ($W_T$) is defined as a content ($X_{B2\text{-}I}$) of an ethylene-propylene copolymer component (B2-I) in the heterophasic propylene polymer material (I).

A content ($X_{B1\text{-}I}$) of an ethylene-propylene copolymer component (B1-I) in the heterophasic propylene polymer material (I) was calculated by the following equation.

$$(X_{B1\text{-}I}) = (X_{B\text{-}I}) - (X_{B2\text{-}I})$$

$X_{B\text{-}I}$ is based on the value calculated from the DSC measurement described above.

A content ($Y_{B2\text{-}I}$) of a monomer unit derived from ethylene in the ethylene-propylene copolymer component (B2-I) in the heterophasic propylene polymer material (I) was calculated by the following equation.

$$(Y_{B2\text{-}I}) = (W_{119°\,C.} \times E_{119°\,C.} W_{123°\,C.} \times E_{123°\,C.}\ W_{127°\,C.} \times E_{127°\,C.} + W_{131°\,C.} \times E_{131°\,C.}\ W_{135°\,C.} \times E_{135°\,C.} W_{139°\,C.} \times E_{139°\,C.} W_{143°\,C.} \times E_{143°\,C.} W_{147°\,C.} \times E_{147°\,C.} + W_{151°\,C.} \times E_{151°\,C.} + W_{155°\,C.} \times E_{155°\,C.} + W_{160°\,C.} \times E_{160°\,C.})/W_T$$

$$W_T = W_{119°\,C.} + W_{123°\,C.} + W_{127°\,C.} + W_{131°\,C.} + W_{135°\,C.} + W_{139°\,C.} + W_{143°\,C.} + W_{147°\,C.} + W_{151°\,C.} + W_{155°\,C.} + W_{160°\,C.}$$

$$E_T = 0.5204 \times T(° C.) + 20.932 \quad (1)$$

Here, $W_T$ is an elution amount (mass %) at a temperature T (° C.) with respect to the total elution amount, and is equal to a difference between an amount of solute after the temperature rise and an amount of solute before the temperature rise. $E_T$ is a value corresponding to a maximum amount (mass %) of the monomer unit derived from the ethylene that can be contained in the ethylene-propylene copolymer component dissolved in orthodichlorobenzene at a concentration of 1.0 mg/ml under a condition of the temperature T (° C.). However, when $E_T$ exceeds 100 (mass %), $E_T$ is 100 (mass %).

A content ($Y_{B1\text{-}I}$) of a monomer unit derived from ethylene in the ethylene-propylene copolymer component (B1-I)

in the heterophasic propylene polymer material (I) was calculated by the following equation.

$$(Y_{B1\text{-}I})=((X_{B\text{-}I})\times(Y_{B\text{-}I})-(X_{B2\text{-}I})\times(Y_{B2\text{-}I}))/(X_{B1\text{-}I})$$

(4) Intrinsic Viscosity of Propylene Homopolymer Component (A-I)

An intrinsic viscosity ($\eta_{A\text{-}I}$) of the propylene homopolymer component (A-I) discharged from the multistage gas phase polymerization reactor in the polymerization step (2-2-2) was an intrinsic viscosity measured in tetralin at a temperature 135° C., and was calculated by a calculation method described in "Polymer Solution, Polymer Experiment Study, Vol. 22" page 491 (published by Kyoritsu Shuppan Co., Ltd., 1982). That is, the intrinsic viscosity was calculated by plotting a reduced viscosity against a concentration and extrapolating the concentration in zero by an extrapolation method. The reduced viscosity was obtained by measuring three points of concentrations of 0.1 g/dL, 0.2 g/dL, and 0.5 g/dL with an Ubbelohde viscometer under a condition of a temperature of 135° C. and a tetralin solvent. The intrinsic viscosity of the propylene homopolymer component (A-I) was 0.9 g/dL.

(5) Intrinsic Viscosity of Ethylene-Propylene Copolymer Component (B-I)

An intrinsic viscosity ($\eta_I$) of the heterophasic propylene polymer material (I) was calculated by the same method as that of the intrinsic viscosity ($\eta_{A\text{-}I}$) of the propylene homopolymer component (A-I). Therefore, an intrinsic viscosity ($\eta_{B\text{-}I}$) of the ethylene-propylene copolymer component (B-I) was calculated by using the following equation.

$$\eta_{B\text{-}I}=(\eta_I-\eta_{B\text{-}I}\times X_{B\text{-}I})/X_{B\text{-}I}$$

The intrinsic viscosity of the ethylene-propylene copolymer component (B-I) was 3.1 g/dL.

Example 2

Production of Heterophasic Propylene Polymer Material (III)

A heterophasic propylene polymer material (II) containing a propylene homopolymer component (A-II) and an ethylene-propylene copolymer component (B-II) was produced in the same manner as that of the heterophasic propylene polymer material (I) except for the values shown in Table 2.

Composition and Physical Properties of Heterophasic Propylene Polymer Material (II)

In the heterophasic propylene polymer material (II), a content ($X_{A\text{-}II}$) of the propylene homopolymer component (A-II) and a content ($X_{B\text{-}II}$) of the ethylene-propylene copolymer component (B-II) were 42.5 mass % and 57.5 mass %, respectively, with respect to 100 mass % of a total content of the propylene homopolymer component (A-II) and the ethylene-propylene copolymer component (B-II).

In addition, in the ethylene-propylene copolymer component (B-II), a content ($Y_{B\text{-}II}$) of a monomer unit derived from ethylene was 42.2 mass % with respect to 100 mass % of a total content of a monomer unit derived from propylene and the monomer unit derived from the ethylene.

In addition, in an ethylene-propylene copolymer component (B1-II), a content ($X_{B1\text{-}II}$) of a monomer unit derived from ethylene was 33.6 mass % with respect to 100 mass % of a total content of a monomer unit derived from propylene and the monomer unit derived from the ethylene.

In an ethylene-propylene copolymer component (B2-II), a content ($X_{B2}$-II) of a monomer unit derived from ethylene was 89.9 mass % with respect to 100 mass % of a total content of a monomer unit derived from propylene and the monomer unit derived from the ethylene.

An intrinsic viscosity of the propylene homopolymer component (A-II) was 1.1 g/dL.

An intrinsic viscosity of the ethylene-propylene copolymer component (B-II) was 2.6 g/dL.

Example 3

Production of Heterophasic Propylene Polymer Material (III)

Preliminary Polymerization (2-1)

A SUS autoclave having an internal volume of 3 L equipped with a stirrer was charged with 1.0 L of sufficiently dehydrated and deaerated n-hexane, 20 mmol of triethylaluminum, and 2.0 mmol of t-butyl-n-propyldimethoxysilane (electron donor component). Into the SUS autoclave, 10 g of the solid catalyst component produced in Production of solid catalyst component was added, and 10 g of propylene was sequentially fed over a period of about 30 minutes while keeping the temperature in the autoclave at about 10° C., thereby performing preliminary polymerization. Next, a slurry subjected to the preliminary polymerization was transferred to a SUS316L autoclave having an internal volume of 150 L equipped with a stirrer, and 100 L of liquid butane was added thereto, thereby obtaining a slurry of a preliminary polymerization catalyst component.

Main Polymerization (2-2)

By using a reaction apparatus in which a slurry polymerization reactor and two gas phase reactors were serially disposed, a propylene homopolymer component (A-III) was produced in the following polymerization steps (2-2-1) and (2-2-2), and transferred to the subsequent stage without deactivating the produced propylene homopolymer component (A-III). In addition, an ethylene-propylene copolymer component (B-III) was produced in the following polymerization steps (2-2-3) and (2-2-4).

Bulk Polymerization in Polymerization Step (2-2-1)

Homopolymerization of propylene was performed using a SUS304 loop type reactor. That is, propylene, hydrogen, triethylaluminum, t-butyl-n-propyldimethoxysilane, and the slurry of the preliminary polymerization catalyst component produced in the preliminary polymerization (2-1) were sequentially fed to the reactor, and then the polymerization reaction was performed, thereby obtaining propylene homopolymer particles. The reaction conditions were as follows.

Polymerization temperature: 50° C.
Liquid level of reactor: 30 L
Feeding amount of propylene: 35.0 kg/hr
Feeding amount of hydrogen: 74.0 NL/hr
Feeding amount of triethylaluminum: 41.2 mmol/hr
Feeding amount of t-butyl-n-propyldimethoxysilane: 8.33 mmol/hr
Feeding amount of slurry of preliminary polymerization catalyst component (in terms of polymerization catalyst component): 0.50 g/hr
Polymerization pressure: 4.00 MPa (gauge pressure)
Average retention time: 0.39 hr Gas Phase Polymerization in Polymerization Step (2-2-2)

Propylene homopolymer particles discharged from the loop type reactor in the polymerization step (2-2-1) were sequentially fed to a fluidized bed type reactor. The fluidized bed type reactor was provided with a gas distribution plate, and the propylene homopolymer particles were sequentially fed without deactivation.

Propylene and hydrogen were sequentially fed from a lower part of the fluidized bed type reactor. By doing so, a fluidized bed was formed in the fluidized bed type reactor, the feeding amounts of propylene and hydrogen were controlled so as to keep a gas composition and a pressure constant, and homopolymerization of propylene was further performed in the presence of the propylene homopolymer particles while purging an excess gas, thereby producing a propylene homopolymer component (A-III). The reaction conditions were as follows.

Polymerization temperature: 70° C.

Polymerization pressure: 1.95 MPa (gauge pressure)

In the fluidized bed type reactor, a gas concentration ratio of hydrogen/(hydrogen+propylene) in the reactor was 8.2 mol %, and an average retention time of the polymer in the polymerization reactor was 2.0 hr.

The obtained propylene homopolymer component (A-III) was partially sampled for evaluation, and then a next polymerization step (2-2-3) was performed.

Gas Phase Polymerization in Polymerization Step (2-2-3)

Particles of the propylene homopolymer component (A-III) discharged from the fluidized bed type reactor in the polymerization step (2-2-2) were sequentially fed to a fluidized bed type reactor of the subsequent stage. The fluidized bed type reactor in a polymerization step (2-2-3) was provided with the same gas dispersion plate as in the fluidized bed type reactor in the polymerization step (2-2-2), and the particles of the propylene homopolymer component (A-III) were sequentially fed without deactivation.

Propylene, ethylene, and hydrogen were sequentially fed to the fluidized bed type reactor having the above configuration, the gas feeding amount was controlled so as to keep a gas composition and a pressure constant, and copolymerization of propylene and ethylene was performed in the presence of the particles of the propylene homopolymer component (A-III) while purging an excess gas. Reaction conditions were set as follows to obtain a heterophasic propylene polymer material (III) containing the propylene homopolymer component (A-III) and the ethylene-propylene copolymer component (B-III).

Polymerization temperature: 70° C.

Polymerization pressure: 1.40 MPa (gauge pressure)

In the fluidized bed type reactor, in a concentration ratio of gas in the reactor, a ratio of ethylene/(propylene+ethylene) was 36.3 mol %, and a ratio of hydrogen/(hydrogen+propylene+ethylene) was 3.25 mol %. The average retention time of the polymer in the polymerization reactor was 2.6 hr.

Composition and Physical Properties of Heterophasic Propylene Polymer Material (III)

In the heterophasic propylene polymer material (III), a content ($X_{A-III}$) of the propylene homopolymer component (A-III) and a content ($X_{B-III}$) of the ethylene-propylene copolymer component (B-III) were 48.5 mass % and 51.5 mass %, respectively, with respect to 100 mass % of a total content of the propylene homopolymer component (A-III) and the ethylene-propylene copolymer component (B-III).

In addition, in the ethylene-propylene copolymer component (B-III), a content ($Y_{B-III}$) of a monomer unit derived from ethylene was 40.4 mass % with respect to 100 mass % of a total content of a monomer unit derived from propylene and the monomer unit derived from the ethylene.

In addition, in an ethylene-propylene copolymer component (B1-III), a content ($X_{B1-III}$) of a monomer unit derived from ethylene was 30.2 mass % with respect to 100 mass % of a total content of a monomer unit derived from propylene and the monomer unit derived from the ethylene.

In an ethylene-propylene copolymer component (B2-III), a content ($X_{B2-III}$) of a monomer unit derived from ethylene was 90.0 mass % with respect to 100 mass % of a total content of a monomer unit derived from propylene and the monomer unit derived from the ethylene.

An intrinsic viscosity of the propylene homopolymer component (A-III) was 1.0 g/dL.

An intrinsic viscosity of the ethylene-propylene copolymer component (B-III) was 2.6 g/dL.

Comparative Example 1

Production of Heterophasic Propylene Polymer Material (IV)

A heterophasic propylene polymer material (IV) containing a propylene homopolymer component (A-IV) and an ethylene-propylene copolymer component (B-IV) was produced in the same manner as that of the heterophasic propylene polymer material (I) except for the values shown in Table 2.

Composition and Physical Properties of Heterophasic Propylene Polymer Material (IV)

In the heterophasic propylene polymer material (IV), a content ($X_{A-IV}$) of the propylene homopolymer component (A-IV) and a content ($X_{B-IV}$) of the ethylene-propylene copolymer component (B-IV) were 47.1 mass % and 52.9 mass %, respectively, with respect to 100 mass % of a total content of the propylene homopolymer component (A-IV) and the ethylene-propylene copolymer component (B-IV).

In addition, in the ethylene-propylene copolymer component (B-IV), a content ($Y_{B-IV}$) of a monomer unit derived from ethylene was 32.5 mass % with respect to 100 mass % of a total content of a monomer unit derived from propylene and the monomer unit derived from the ethylene.

In an ethylene-propylene copolymer component (B1-IV), a content ($X_{B1-IV}$) of a monomer unit derived from ethylene was 25.4 mass % with respect to 100 mass % of a total content of a monomer unit derived from propylene and the monomer unit derived from the ethylene.

In an ethylene-propylene copolymer component (B2-IV), a content ($X_{B2-IV}$) of a monomer unit derived from ethylene was 90.1 mass % with respect to 100 mass % of a total content of a monomer unit derived from propylene and the monomer unit derived from the ethylene.

An intrinsic viscosity of the propylene homopolymer component (A-IV) was 1.0 g/dL.

An intrinsic viscosity of the ethylene-propylene copolymer component (B-IV) was 2.9 g/dL.

TABLE 2

Table 2: Polymerization reaction condition

|  |  | Heterophasic propylene polymer material | | | |
|---|---|---|---|---|---|
| Polymerization step | Polymerization reaction condition | I (Example 1) | II (Example 2) | III (Example 3) | IV (Comparative Example 1) (Example 1) |
| (2-1) Preliminary polymerization | TEA concentration [mmol/L] | 35 | 35 | 20 | 35 |
|  | Electron donor component concentration/TEA concentration | 0.1 | 0.1 | 0.1 | 0.1 |
|  | Solid catalyst component concentration [g/L] | 9 | 9 | 6 | 9 |
|  | Temperature [° C.] | 10 | 10 | 10 | 10 |
|  | Propylene/solid catalyst component [g/g] | 1 | 1 | 1 | 1 |
| (2-2) Main polymerization | Propylene homopolymer | | | | |
|  | Polymerization step (2-2-1) Bulk polymerization — Polymerization temperature [° C.] | 50 | 50 | 50 | 50 |
|  | Polymerization pressure [MPaG] | 3.95 | 3.64 | 4.00 | 4.31 |
|  | Average retention time [hr] | 0.55 | 0.36 | 0.39 | 0.83 |
|  | Propylene feeding amount [kg/hr] | 20.0 | 20.0 | 35.0 | 12.5 |
|  | Hydrogen feeding amount [NL/hr] | 56.0 | 42.0 | 74.0 | 30.0 |
|  | TEA feeding amount [mmol/hr] | 42.3 | 45.4 | 41.2 | 41.6 |
|  | Electron donor component feeding amount [mmol/hr] | 8.38 | 8.81 | 8.33 | 7.93 |
|  | Solid catalyst component feeding amount [g/hr] | 0.66 | 0.65 | 0.50 | 0.80 |
|  | Polymerization step (2-2-2) Gas phase polymerization — Polymerization temperature [° C.] | 70 | 70 | 70 | 70 |
|  | Polymerization pressure [MPaG] | 1.40 | 1.70 | 1.95 | 1.40 |
|  | Average retention time [hr] | 3.4 | 3.6 | 2.0 | 3.4 |
|  | Hydrogen concentration [mol %] *1 | 9.9 | 8.2 | 8.2 | 8.2 |
|  | Ethylene-propylene copolymer (A) | | | | |
|  | Polymerization step (2-2-3) Gas phase polymerization — Polymerization temperature [° C.] | 70 | 70 | 70 | 70 |
|  | Polymerization pressure [MPaG] | 1.37 | 1.66 | 1.40 | 1.37 |
|  | Average retention time [hr] | 1.6 | 1.6 | 2.6 | 1.1 |
|  | Hydrogen concentration [mol %] *2 | 3.08 | 3.74 | 3.25 | 2.67 |
|  | Ethylene concentration [mol %] *3 | 51.4 | 45.1 | 36.3 | 37.3 |
|  | Polymerization step (2-2-4) Gas phase polymerization — Polymerization temperature [° C.] | 70 | 70 | — | 70 |
|  | Polymerization pressure [MPaG] | 1.32 | 1.61 | — | 1.32 |
|  | Average retention time [hr] | 0.57 | 0.57 | — | 0.47 |
|  | Hydrogen concentration [mol %] *2 | 3.08 | 3.87 | — | 2.67 |
|  | Ethylene concentration [mol %] *3 | 51.4 | 45.2 | — | 37.3 |

*1 Hydrogen/(Hydrogen + Propylene)
*2 Hydrogen/(Hydrogen + Ethylene + Propylene)
*3 Ethylene/(Propylene + Ethylene)

Example 4

Material

Heterophasic Propylene Polymer Material

Content of propylene homopolymer component (A): 47.5 mass %

Content of ethylene-propylene copolymer component (B): 52.5 mass %

Content of monomer unit derived from ethylene in ethylene-propylene copolymer component (B): 40.8 mass %

Content of monomer unit derived from ethylene in ethylene-propylene copolymer component (B1): 31.5 mass %

Content of monomer unit derived from ethylene in ethylene-propylene copolymer component (B2): 89.6 mass %

Intrinsic viscosity [η] of propylene homopolymer component (A): 0.9 g/dL

Intrinsic viscosity [η] of ethylene-propylene copolymer component (B): 3.1 g/dL

Others

Antioxidant 1: SUMILIZER GA-80, manufactured by Sumitomo Chemical Co., Ltd.

Antioxidant 2: SUMILIZER GP, manufactured by Sumitomo Chemical Co., Ltd.

Neutralizer: Calcium stearate, manufactured by SUN ACE CORPORATION

Melting and Kneading and Production of Injection Molded Article 100 parts by mass of the heterophasic propylene polymer material, 0.1 parts by mass of the antioxidant 1, 0.1 parts by mass of the antioxidant 2, and 0.05 parts by mass of the neutralizer were mixed with each other to obtain a mixture. The mixture was melted and kneaded at a cylinder temperature of 220° C. and a screw rotation speed of 100 rpm using a single screw extruder to be pelletized. Injection molding was performed under conditions of a cylinder temperature of 220° C. and a mold temperature of 50° C. using an injection molding machine (EC160NII, manufactured by Toshiba Machine Co., Ltd.) to obtain an injection molded article having a length of 90 mm, a width of 150 mm, and a thickness of 2 mm. Compositions of the injection molded article are shown in Table 3.

Evaluation of Physical Properties

Physical properties of the obtained injection molded article were evaluated by the following items (1) to (4). The results are shown in Table 3.

(1) Melt Flow Rate (MFR)

A melt flow rate (MFR) was measured at 230° C. and a load of 21.18 N according to JIS K7210:1999.

(2) Tensile Strength at Break (TB) and Tensile Elongation at Break (EB)

Tensile strength at break and tensile elongation at break were measured at room temperature (about 23° C.) according to JIS K6251:1993. A JIS No. 3 dumbbell was used at a tensile speed of 200 mm/min.

(3) Rigidity

Rigidity was measured at room temperature (about 23° C.) by bending strength according to JIS K7203:1977. A strip-shaped test piece having a length of 90 mm, a width of 20 mm, and a thickness of 2 mm was prepared from the obtained injection molded article using a punching blade. An inter-fulcrum distance was 30 mm and a bending speed was 1 mm/min.

(4) Low Temperature Impact Resistance (IZOD)

Impact resistance was measured according to JIS K7110: 1984. A strip-shaped test piece of 64×12.7×2 mm was punched from the obtained injection molded article using the punching blade, six strip-shaped test pieces having the same size were stacked and wound with a tape, and the wound strip-shaped test pieces were used as a test piece for measuring low temperature impact resistance. A measurement temperature was −42° C. In Table 3, NB indicates that the injection molded article was not breakable, and B indicates that the injection molded article was breakable.

Measurement of Number of Infusible Particles in Heterophasic Propylene Polymer Material The heterophasic propylene polymer material was melted and extruded at a set temperature of 220° C. and a screw rotation speed of 100 rpm using a 40 mm granulator (VS40-28 vent type extruder, manufactured by TANABE PLASTICS MACHINERY CO., LTD.) equipped with a 100 mesh screen pack to obtain pellets. The obtained pellets were melted and extruded at a cylinder temperature of 230° C. using a single screw extruder (VS20 extruder, manufactured by TANABE PLASTICS MACHINERY CO., LTD.) having a screw diameter of 20 mm. The extruded melt was stretched while cooling the extruded melt using a cooling roll through which cooling water of 30° C. was passed to obtain a sheet for measuring the number of infusible particles, the sheet having a thickness of 50 to 60 μm and a width of 60 to 70 mm.

A surface of the obtained sheet for measuring the number of infusible particles was observed with a scanner (GT-X970, manufactured by Epson) to obtain an image of a sheet surface. The obtained image was imported to a computer under conditions of 900 dpi and 8 bit, and binarization processing was performed so that a portion having a threshold of 120 or more was distinguished as white, a portion having a threshold of less than 120 was distinguished as black. The binarization processing was performed using image analysis software (A image-kun, manufactured by ASAHI ENGINEERING CO., LTD.), and the white portion was regarded as an infusible particle. A diameter of the infusible particle was defined as an equivalent circle diameter of the infusible particle. The number of infusible particles having an equivalent circle diameter of 100 μm or more per 100 cm$^2$ of a sheet area (number/100 cm$^2$) was counted. The results are shown in Table 3.

Example 5

The same operation as in Example 4 was performed except that the heterophasic propylene polymer material was formulated as follows.

Heterophasic propylene polymer material Content of propylene homopolymer component (A): 42.5 mass %

Content of ethylene-propylene copolymer component (B): 57.5 mass %

Content of monomer unit derived from ethylene in ethylene-propylene copolymer component (B): 42.2 mass %

Content of monomer unit derived from ethylene in ethylene-propylene copolymer component (B1): 33.6 mass %

Content of monomer unit derived from ethylene in ethylene-propylene copolymer component (B2): 89.9 mass %

Intrinsic viscosity of propylene homopolymer component (A): 1.1 g/dL

Intrinsic viscosity of ethylene-propylene copolymer component (B): 2.6 g/dL

Example 6

New Material

Ethylene-α-olefin copolymer

Engage 8407, manufactured by The Dow Chemical Company

Content of monomer unit derived from ethylene in ethylene-octene copolymer: 65 mass %

MFR=30 g/10 min, ASTM D 1238 (2.16 kg, 190° C.)

Density=0.870 g/cm$^3$, ASTM D 792

Others

Release agent: Erucic acid amide (NEUTRON-S, manufactured by Nippon Fine Chemical)

Antioxidant 3: Irganox 168, manufactured by BASF Japan Ltd.

Light stabilizer 1: Sumisorb 300, manufactured by Sumitomo Chemical Co., Ltd.

Light stabilizer 2: Tinuvin 622SF, manufactured by BASF Japan Ltd.

Light stabilizer 3: Tinuvin XT850FF, manufactured by BASF Japan Ltd.

Preservative: Hydrotalcite (DHT-4A, manufactured by Kyowa Chemical Industry Co., Ltd.)

Melting and Kneading and Production of Injection Molded Article 90 parts by mass of the heterophasic propylene polymer material and 0.1 parts by mass of the antioxidant 1 used in Example 3, 10.0 parts by mass of the ethylene-α-olefin copolymer, 0.10 parts by mass of the release agent, 0.1 parts by mass of the antioxidant 3, 0.2 parts by mass of the light stabilizer 1, 0.1 parts by mass of the light stabilizer 2, 0.1 parts by mass of the light stabilizer 3, and 0.2 parts by mass of the preservative were mixed with each other to obtain a mixture. The mixture was melted and kneaded at a cylinder temperature of 200° C. for about 1 minute using a double screw extruder to obtain a thermoplastic elastomer composition. An injection molded article was obtained from the obtained thermoplastic elastomer composition in the same manner as that of Example 3. Compositions of the injection molded article are shown in Table 3.

Evaluation of physical properties and measurement of the number of infusible particles in the heterophasic propylene polymer material were performed in the same manner as that of Example 4.

Example 7

The same operation as in Example 4 was performed except that the heterophasic propylene polymer material was formulated as follows.

Heterophasic Propylene Polymer Material

Content of propylene homopolymer component (A): 48.5 mass %

Content of ethylene-propylene copolymer component (B): 51.5 mass %

Content of monomer unit derived from ethylene in ethylene-propylene copolymer component (B): 40.4 mass %

Content of monomer unit derived from ethylene in ethylene-propylene copolymer component (B1): 30.2 mass %

Content of monomer unit derived from ethylene in ethylene-propylene copolymer component (B2): 90.0 mass %

Intrinsic viscosity of propylene homopolymer component (A): 1.0 g/dL

Intrinsic viscosity of ethylene-propylene copolymer component (B): 2.6 g/dL

Comparative Example 2

The same operation as in Example 4 was performed except that the heterophasic propylene polymer material was formulated as follows.

Heterophasic Propylene Polymer Material

Content of propylene homopolymer component (A): 47.1 mass %

Content of ethylene-propylene copolymer component (B): 52.9 mass %

Content of monomer unit derived from ethylene in ethylene-propylene copolymer component (B): 32.5 mass %

Content of monomer unit derived from ethylene in ethylene-propylene copolymer component (B1): 25.4 mass %

Content of monomer unit derived from ethylene in ethylene-propylene copolymer component (B2): 90.1 mass %

Intrinsic viscosity of propylene homopolymer component (A): 1.0 g/dL

Intrinsic viscosity of ethylene-propylene copolymer component (B): 2.9 g/dL automobile exterior part such as a mold, a household appliance member, a constructional member, furniture, or general merchandise by a known molding processing method and preferably an injection molding method.

What is claimed is:

1. A heterophasic propylene polymer material comprising a propylene homopolymer component (A) and the following ethylene-propylene copolymer component (B),
    wherein a viscosity of the propylene homopolymer component (A) is 0.80 to 1.20 dl/g,
    wherein a content of the propylene homopolymer component (A) and a content of the ethylene-propylene copolymer component (B) are 40 to 70 parts by mass and 30 to 60 parts by mass, respectively, with respect to 100 parts by mass of a total content of the propylene homopolymer component (A) and the ethylene-propylene copolymer component (B),
    the ethylene-propylene copolymer component (B) contains the following ethylene-propylene copolymer component (B1) and the following ethylene-propylene copolymer component (B2),
    a content of the ethylene-propylene copolymer component (B1) and a content of the ethylene-propylene copolymer component (B2) are 15 to 54 parts by mass and 6 to 15 parts by mass, respectively, with respect to 100 parts by mass of the total content of the propylene

TABLE 3

Table 3: Material formulation and evaluation result

| | | | Example 4 | Example 5 | Example 6 | Example 7 | Comparative Example 2 |
|---|---|---|---|---|---|---|---|
| Heterophasic propylene polymer material | Propylene homopolymer component (A) | Intrinsic viscosity (g/dL) | 0.9 | 1.1 | 0.9 | 1.0 | 1.0 |
| | | C2' (mass %) | 0 | 0 | 0 | 0 | 0 |
| | | Content (mass %) | 47.5 | 42.5 | 42.75 | 48.5 | 47.1 |
| | Ethylene-propylene copolymer component (B) | Intrinsic viscosity (g/dL) | 3.1 | 2.6 | 3.1 | 2.6 | 2.9 |
| | | C2' (mass %) | 41 | 42 | 41 | 40 | 33 |
| | | Content (mass %) | 52.5 | 57.5 | 47.25 | 51.5 | 52.9 |
| | Ethylene-propylene copolymer component (B1) | Content (mass %) | 43.9 | 48.9 | 35.6 | 42.7 | 47.1 |
| | | C2' (mass %) | 31.5 | 33.6 | 31.5 | 30.2 | 25.4 |
| | Ethylene-propylene copolymer component (B2) | Content (mass %) | 8.6 | 8.6 | 7.7 | 8.8 | 5.8 |
| | | C2' (mass %) | 89.6 | 89.9 | 89.6 | 90.0 | 90.1 |
| Ethylene-α-olefin copolymer | | Content (mass %) | 0 | 0 | 10 | 0 | 0 |
| Evaluation item | MFR (g/10 min) | | 4.7 | 4.8 | 5.9 | 8.3 | 5.0 |
| | Low temperature impact resistance (NB or B) | | NB | NB | NB | NB | Break |
| | Rigidity (Mpa) | | 439 | 418 | 369 | 477 | 490 |
| | Tensile strength (Mpa) | | 13.4 | 15.8 | 14.6 | 12.6 | 18.0 |
| | Tensile elongation (%) | | 417 | 446 | 503 | 376 | 500 |
| | Number of infusible particles (number/100 cm$^2$) | | 521 | 186 | 521 | 2803 | 5.0 |

INDUSTRIAL APPLICABILITY

The heterophasic propylene polymer material according to an embodiment of the present invention is processed into a molded article such as an airbag cover, an automobile interior part such as an instrument panel or a pillar, an homopolymer component (A) and the ethylene-propylene copolymer component (B), the ethylene-propylene copolymer component (B1) contains a monomer unit derived from ethylene and a monomer unit derived from propylene, a content of the monomer unit derived from the ethylene and a content of the monomer unit derived from the propylene are 1 to 50 parts by mass and 50 to 99 parts by mass, respectively, with respect to 100 parts by mass of a total content of the monomer unit derived from the ethylene and the monomer unit derived from the propylene, the ethylene-propylene copolymer component (B2) contains a monomer unit derived from ethylene and a monomer unit derived from propylene, and a content of the monomer unit derived from the ethylene and a content of the monomer unit derived from the propylene are 80 to 99 parts by mass and 1 to 20 parts by mass, respectively, with respect to 100 parts by mass of a total content of the monomer unit derived from the ethylene and the monomer unit derived from the propylene.

2. The heterophasic propylene polymer material according to claim 1, wherein the content of the ethylene-propylene copolymer component (B2) is 7 to 13 parts by mass with respect to 100 parts by mass of the total content of the propylene homopolymer component (A) and the ethylene-propylene copolymer component (B).

3. The heterophasic propylene polymer material according to claim 1, wherein the content of the ethylene-propylene copolymer component (B1) is 30 to 50 parts by mass with respect to 100 parts by mass of the total content of the propylene homopolymer component (A) and the ethylene-propylene copolymer component (B).

4. The heterophasic propylene polymer material according to claim 1, wherein in the ethylene-propylene copolymer component (B1), the content of the monomer unit derived from the ethylene and the content of the monomer unit derived from the propylene are 5 to 50 parts by mass and 50 to 95 parts by mass, respectively, with respect to 100 parts by mass of the total content of the monomer unit derived from the ethylene and the monomer unit derived from the propylene.

5. The heterophasic propylene polymer material according to claim 1, wherein the content of the propylene homopolymer component (A) and the content of the ethylene-propylene copolymer component (B) are 45 to 55 parts by mass and 45 to 55 parts by mass, respectively, with respect to 100 parts by mass of the total content of the propylene homopolymer component (A) and the ethylene-propylene copolymer component (B).

6. The heterophasic propylene polymer material according to claim 1, wherein a viscosity of the ethylene-propylene copolymer component (B) is 2.00 to 4.00 dl/g.

7. The heterophasic propylene polymer material according to claim 1, wherein the number of infusible particles having a diameter of 100 μm or more present in a sheet for measuring the number of infusible particles is 2,000 or less per 100 $cm^2$ of a sheet area, the sheet being obtained by the following procedures (a) to (d):

(a) mixing 100 parts by mass of the heterophasic propylene polymer material, 0.05 parts by mass of a neutralizer, and 0.2 parts by mass of an antioxidant with each other to obtain a mixture;

(b) melting and extruding the obtained mixture at a cylinder temperature of 220° C. and a screw rotation speed of 100 rpm using a 40 mm granulator equipped with a 100 mesh screen pack to obtain pellets;

(c) melting and extruding the obtained pellets at a cylinder temperature of 230° C. using a single screw extruder having a screw diameter of 20 mm; and (d) cooling an extruded melt using a cooling roll through which cooling water of 30° C. is passed to form a sheet having a thickness of 50 μm to 60 μm and a width of 60 mm to 70 mm.

8. The heterophasic propylene polymer material according to claim 7, wherein the number of infusible particles is 800 or less per 100 $cm^2$ of the sheet area.

9. The heterophasic propylene polymer material according to claim 1, wherein the heterophasic propylene polymer material is a polymer material obtained by a multistage polymerization method.

10. A thermoplastic elastomer composition comprising:
the heterophasic propylene polymer material according to claim 1; and
an ethylene-α-olefin copolymer contains a monomer unit derived from ethylene and a monomer unit derived from an α-olefin having 4 to 10 carbon atoms.

11. The thermoplastic elastomer composition according to claim 10, wherein a content of the ethylene-α-olefin copolymer is 5 to 20 parts by mass with respect to 100 parts by mass of a content of the heterophasic propylene polymer material.

12. A molded article comprising the heterophasic propylene polymer material according to claim 1.

13. An airbag cover material comprising the heterophasic propylene polymer material according to claim 1.

14. A molded article comprising the thermoplastic elastomer composition according to claim 10.

15. An airbag cover material comprising the thermoplastic elastomer composition according to claim 10.

* * * * *